(12) United States Patent
He et al.

(10) Patent No.: US 11,677,802 B2
(45) Date of Patent: Jun. 13, 2023

(54) METHODS AND APPARATUS TO REDUCE LATENCY FOR 360-DEGREE VIEWPORT ADAPTIVE STREAMING

(71) Applicant: Vid Scale, Inc., Wilmington, DE (US)

(72) Inventors: Yong He, San Diego, CA (US); Yan Ye, San Diego, CA (US); Srinivas Gudumasu, San Diego, CA (US); Eduardo Asbun, Santa Clara, CA (US); Ahmed Hamza, Montreal (CA); Ali C. Begen, Konya (TR)

(73) Assignee: Vid Scale, Inc., Wilmington, DE (US)

( * ) Notice: Subject to any disclaimer, the term of this patent is extended or adjusted under 35 U.S.C. 154(b) by 334 days.

(21) Appl. No.: 16/330,334

(22) PCT Filed: Sep. 8, 2017

(86) PCT No.: PCT/US2017/050766
§ 371 (c)(1),
(2) Date: Mar. 4, 2019

(87) PCT Pub. No.: WO2018/049221
PCT Pub. Date: Mar. 15, 2018

(65) Prior Publication Data
US 2019/0230142 A1    Jul. 25, 2019

Related U.S. Application Data

(60) Provisional application No. 62/385,733, filed on Sep. 9, 2016.

(51) Int. Cl.
H04N 13/111    (2018.01)
H04L 65/80     (2022.01)
(Continued)

(52) U.S. Cl.
CPC ............ *H04L 65/80* (2013.01); *H04L 65/612* (2022.05); *H04L 65/65* (2022.05); *H04L 65/70* (2022.05);
(Continued)

(58) Field of Classification Search
CPC ... H04L 65/80; H04L 65/4084; H04L 65/601; H04L 65/607; H04L 65/608;
(Continued)

(56) References Cited

U.S. PATENT DOCUMENTS

2007/0229397 A1    10/2007    Sefton
2011/0010629 A1    1/2011    Castro
(Continued)

FOREIGN PATENT DOCUMENTS

CN    102474510 A    5/2012
CN    102986218 A    3/2013
(Continued)

OTHER PUBLICATIONS

International Preliminary Report on Patentability for PCT/US2017/050766 dated Mar. 12, 2019, 10 pages.
(Continued)

Primary Examiner — Tung T Vo
(74) Attorney, Agent, or Firm — Invention Mine LLC

(57) ABSTRACT

A client device adaptively streams a 360-degree video. A first segment is displayed based on a first viewing direction at a first time, where the first viewing direction is associated with a first viewport. The client requests a first base buffer segment based on the first viewport. The first base buffer segment has a presentation time after the first segment. At a second time, the viewing direction changes to a second viewing direction associated with a second viewport. The client requests, prior to the presentation time, a first viewport buffer segment based on the second viewport, with the same
(Continued)

presentation time. The client device displays a second segment at the presentation time, wherein the second segment is either the first viewport buffer segment or the first base buffer segment. The client provides reports on viewport switching latency and on the most-requested segments.

12 Claims, 18 Drawing Sheets

(51) Int. Cl.
| | |
|---|---|
| H04N 21/6587 | (2011.01) |
| H04N 21/81 | (2011.01) |
| H04N 21/2343 | (2011.01) |
| H04N 21/442 | (2011.01) |
| H04N 21/647 | (2011.01) |
| H04N 21/845 | (2011.01) |
| H04N 21/218 | (2011.01) |
| H04L 65/65 | (2022.01) |
| H04L 65/70 | (2022.01) |
| H04L 65/75 | (2022.01) |
| H04L 65/612 | (2022.01) |

(52) U.S. Cl.
CPC ............ *H04L 65/75* (2022.05); *H04N 13/111* (2018.05); *H04N 21/21805* (2013.01); *H04N 21/23439* (2013.01); *H04N 21/44218* (2013.01); *H04N 21/64738* (2013.01); *H04N 21/6587* (2013.01); *H04N 21/816* (2013.01); *H04N 21/8456* (2013.01)

(58) Field of Classification Search
CPC ........... H04N 21/816; H04N 21/23439; H04N 21/44218; H04N 21/64738; H04N 21/8456; H04N 21/21805; H04N 13/111; H04N 21/6587
USPC ........................................................ 348/39
See application file for complete search history.

(56) References Cited

U.S. PATENT DOCUMENTS

| | | | |
|---|---|---|---|
| 2012/0016965 A1 | 1/2012 | Chen | |
| 2013/0169644 A1 | 7/2013 | Bolton | |
| 2013/0286879 A1 | 10/2013 | Elarabawy | |
| 2015/0249813 A1* | 9/2015 | Cole ................ | H04N 21/21805 386/241 |
| 2015/0346812 A1* | 12/2015 | Cole ........................ | G06F 3/017 345/156 |
| 2016/0352791 A1 | 12/2016 | Adams | |
| 2016/0361658 A1 | 12/2016 | Osman | |
| 2017/0118458 A1* | 4/2017 | Gronholm ............ | H04N 13/156 |
| 2017/0188058 A1* | 6/2017 | Nakashima ........ | H04N 21/2387 |
| 2017/0230692 A1* | 8/2017 | Nakashima ...... | H04N 21/44222 |
| 2017/0237964 A1* | 8/2017 | Maenpaa ............. | H04N 13/243 348/39 |
| 2017/0237983 A1 | 8/2017 | Adsumilli | |
| 2017/0270635 A1 | 9/2017 | Chun | |
| 2017/0289221 A1* | 10/2017 | Khalid .................. | H04L 65/602 |
| 2017/0316607 A1* | 11/2017 | Khalid .................... | G06F 3/147 |
| 2017/0316806 A1 | 11/2017 | Warren | |
| 2018/0077210 A1 | 3/2018 | Hannuksela | |
| 2018/0091866 A1* | 3/2018 | Sun ........................ | H04N 21/61 |
| 2018/0124374 A1* | 5/2018 | Smith .................. | H04N 13/332 |
| 2018/0376126 A1* | 12/2018 | Hannuksela ........... | H04N 19/30 |
| 2019/0158815 A1 | 5/2019 | He | |
| 2019/0238609 A1 | 8/2019 | Skupin | |
| 2019/0246094 A1 | 8/2019 | Mate | |
| 2019/0362151 A1 | 11/2019 | Stokking | |
| 2020/0037029 A1 | 1/2020 | He | |
| 2020/0107007 A1 | 4/2020 | Yip | |

FOREIGN PATENT DOCUMENTS

| | | |
|---|---|---|
| CN | 103702099 A | 4/2014 |
| CN | 104735464 A | 6/2015 |
| CN | 10743901 | 12/2017 |
| CN | 107735152 A | 2/2018 |
| EP | 3367626 A1 | 8/2018 |
| GB | 2523554 A | 9/2015 |
| WO | 2015184416 A1 | 12/2015 |
| WO | 2017205794 A1 | 11/2017 |
| WO | 2018009746 A1 | 1/2018 |
| WO | 2018035133 A1 | 2/2018 |
| WO | 2018045108 A1 | 3/2018 |
| WO | 2018049221 A1 | 3/2018 |

OTHER PUBLICATIONS

Kuzyakov, E., et. al., "Next-Generation Video Encoding Techniques For 360 Video and VR". Retrieved from https://code.fb.com/virtual-reality/next-generation-video-encoding-techniques-for-360-video-and-vr/, Jan. 21, 2016, 9 pages.
International Organization for Standardization, "Information Technology—Dynamic Adaptive Streaming Over HTTP (DAS), Part 1: Media Presentation Description and Segment Formats". International Standard, ISO/IEC 23009-1, Second Edition, May 15, 2014, 152 pages.
Le Feuvre, J., et al., "Describing Tile Regions in ISOBMFF". Telecom ParisTech, Canon Research Centre France, ISO/IEC JTC1/SC29/WG11 MPEG2016/m38644, May 2016, 3 pages.
Facebook Engineering, "Encoding for 360 Video and VR". Retrieved from https://www.facebook.com/Engineering/videos/10153781047207200/, Jan. 21, 2016, 27 pages.
Sodagar, I., "MPEG-DASH: The Standard for Multimedia Streaming over Internet". Microsoft Corporation, Communication Group, ISO/IEC JTC1/SC29/WG11 W13533, Apr. 2012, 6 pages.
International Standard, "Information Technology—Coding of Audio-visual Objects Part 12: ISO Base Media File Format". ISO/IEC 14496-12, fifth edition, Feb. 20, 2015, 256 pages.
International Standard, "Information Technology—Generic Coding of Moving Pictures and Associated Audio Information: Systems" ISO/IEC 13818-1, second edition, Dec. 1, 2000, 174 pages.
International Standard, "Information Technology—Dynamic adaptive streaming over HTTP (DASH)—Part 5: Server and network assisted DASH (SAND)". ISO/IEC FDIS 23009-5:2015(E), (2015), 56 pages.
Lee, J., et al., "Region Description of 360-Degree Video (VR video) in DASH". LG Electronics, ISO/IEC JTC1/SC29/WG11 MPEG2016/M38568, May-Jun. 2016, 5 pages.
International Standard, "Information Technology—Dynamic Adaptive Streaming Over HTTP(DASH), part 1: Media Presentation Description and Segment Formats". ISO/IEC 23009-1 , second edition, May 15, 2014, 152 pages.
Wang, Ye-Kui, et. al., "Signalling of Most-Interested Regions of VR Video". Qualcomm Incorporated, International Organization for Standardisation, ISO/IEC JTC1/SC29/WG11 MPEG2016/M38559, May-Jun. 2016, 3 pages.
Invitation to pay additional fees, and where applicable, protest fee for PCT/US2017/050766 mailed Nov. 16, 2017.
International Search Report and Written Opinion of the International Searching Authority for PCT/US2017/050766 dated Jan. 11, 2018.
Lucia D'acunto et al: "MPD signaling of 360 content properties for VR applications", 115. MPEG Meeting; May 30, 2016-Mar. 6, 2016; Geneva; (Motion Picture Expert Group or ISO/IEC JTC1/SC29/WG11), No. m38605, May 25, 2016 (May 25, 2016), XP030066957.
Boyce, J., et al., "Draft high efficiency video coding (HEVC) version 2, combined format range extensions (RExt), scalability (SHVC), and multi-view (MV-HEVC) extensions". Joint Collaborative Team on Video Coding (JCT-VC), Document No. JCTVC-R1013, Jul. 2014, 535 pages.

(56) References Cited

OTHER PUBLICATIONS

Wang, Y-K, et al., "Tile Based VR Video Encoding and Decoding Schemes". Joint Collaborative Team on Video Coding (JCT-VC), Document No. JCTVC-X0077, May 2016, 6 pages.
International Organization for Standardization, "Information technology—Coded Representation of Immersive Media (MPEG-I)—Part 2: Omnidirectional Media Format". ISO/IEC JTC1/SC29/WG11, N17399, Feb. 7, 2018, 181 pages.
He, Yong, et al., "2nd WD of ISO/IEC 23090-6 Immersive Media Metrics". International Organization for Standardization, ISO/IEC JTC1/SC29/WG11, N17400, Jan. 2018, 13 pages.
He, Yong, et. al., "Immersive Media Metrics Under Considerations". International Organization for Standardization, ISO/IEC JTC1/SC29/WG11, N17239, Oct. 2017, 6 pages.
Wang, Ye-Kui, "An Overview of Omnidirectional MediA Format (OMAF)". Qualcomm, Dec. 10, 2017, 105 pages.
He, Yong, et al., "[MPEG-I] Part 6 Immersive Media Metrics". International Organization for Standardization, MPEG Meeting, Motion Picture Expert Group, ISO/IEC JTC1/SC29/WG11, No. M42107, Jan. 16, 2018, 9 pages.
Hamza, Ahmed., et al., [MPEG-I] Measurement Guidelines for VR Metrics in MPEG-I Part 6 WD International Organization for Standardization, MPEG Meeting, Motion Picture Expert Group, ISO/IEC JTC1/SC29/WG11, No. M43356, Jul. 2018, 6 pages.
International Search Report and Written Opinion of the International Searching Authority for PCT/US2019/023159 dated May 22, 2019, 12 pages.
International Preliminary Report on Patentability PCT/US2019/023159 dated Sep. 22, 2020, 8 pages.
Gwangju, Motion Picture Expert Group or ISO/IEC JTC1/SC29/WG11, https://mpeg.chiariglione.org/meetings/121, web page accessed May 16, 2022, (6 pages).
Wang, Ye-Kui, et. al., "WD 1 of ISO/IEC 23090-2 OMAF 2nd Edition". International Organization For Standardization, ISO/IEC JTC1/SC29/WG11, N17584, Apr. 2018, 191 pages.
Wang, Ye-Kui, et al., OMAF Editor's Input Text for OMAF WD Based on Filand AHG Agreements. International Organization for Standardization, ISO/IEC JTC1/SC29/WG11 M42923, Jul. 2018.
He, Yong, et al., "WD 3 of ISO/IEC 23090-6 Immersive Media Metrics". International Organization For Standardization, ISO/IEC JTC1/SC29/WG11, N17564, Apr. 2018, 14 pages.
Wang, Yueming, et al., "Efficient Projections for Immersive Video Coding and Transmission", ZTE Technology Journal, Nov. 8, 2017, 50-55.

\* cited by examiner

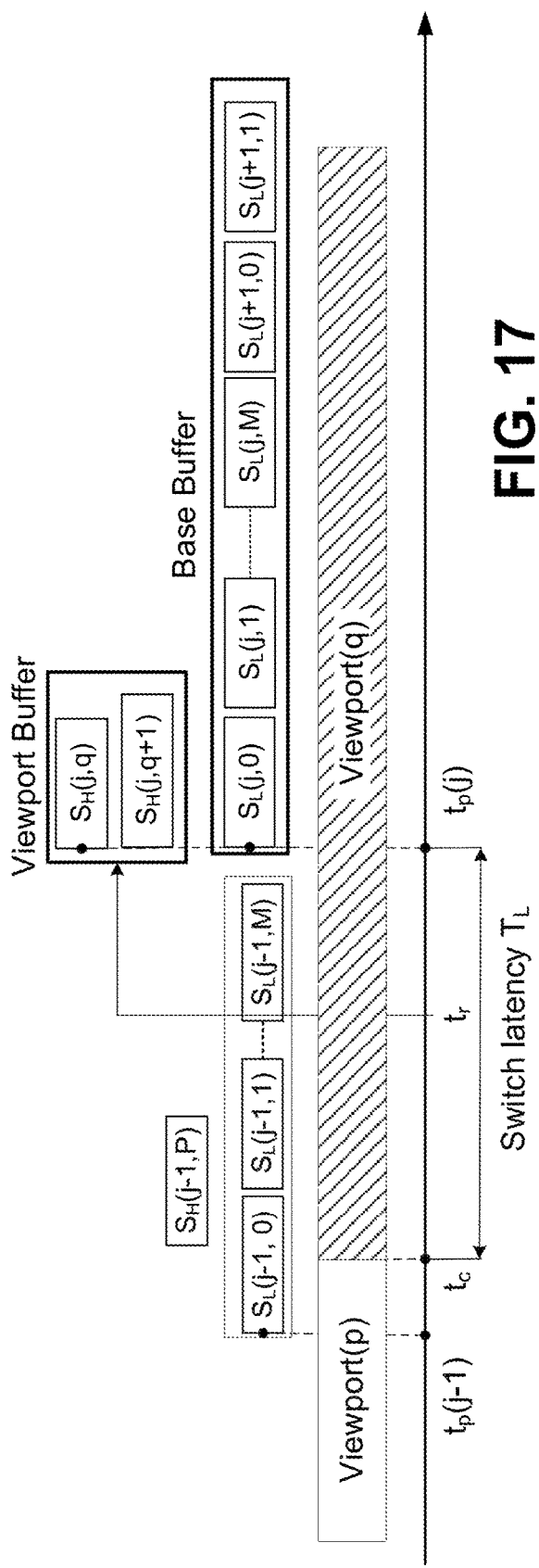
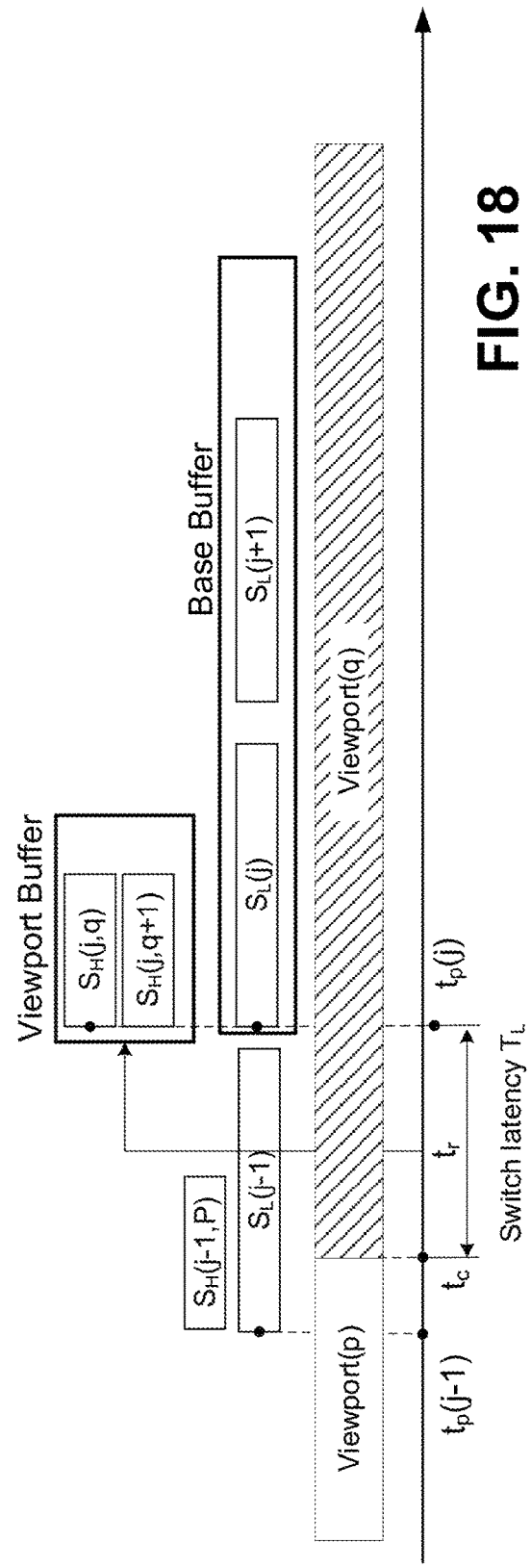
FIG. 17
FIG. 18

METHODS AND APPARATUS TO REDUCE LATENCY FOR 360-DEGREE VIEWPORT ADAPTIVE STREAMING

CROSS-REFERENCE TO RELATED APPLICATIONS

The present application is a national stage application under 35 U.S.C. 371 of International Application No. PCT/US2017/050766, entitled METHODS AND APPARATUS TO REDUCE LATENCY FOR 360-DEGREE VIEWPORT ADAPTIVE STREAMING, filed on Sep. 8, 2017, which claims benefit under 35 U.S.C. § 119(e) from U.S. Provisional Patent Application Ser. No. 62/385,733 entitled "Methods and Apparatus to Reduce Latency for 360-Degree Viewport Adaptive Streaming," filed Sep. 9, 2016, the entirety of which is hereby incorporated by reference in its entirety.

BACKGROUND

360° (or 360-degree) video is a rapidly growing new format emerging in the media industry. It is enabled by the growing availability of VR devices and able to provide the viewer a very new sense of presence. Compared to conventional rectilinear video (2D or 3D), 360° video poses a new and difficult set of engineering challenges on video processing and delivery. Enabling comfort and immersive user experience requires extremely high video quality and very low latency, but the large video size can be an impediment to deliver 360° video with high quality at scale.

When viewing a 360° video, the user is presented with a part of the video. When looking around or zooming, this part will change based on the feedback provided by the Head Mounted Device (HMD) or other types of user interface (e.g., smartphones). A spatial region of the entire 360° video, which may be fully or partially presented to the user and which may have different quality than other parts of the 360° video, is called a viewport.

In order to give a user the ability to choose an arbitrary viewport, 360° videos are generally captured and/or rendered on the surface of a sphere. Such spherical video format generally cannot be delivered directly using conventional video codecs. Rather, two steps are generally used to compress a 360° video or spherical video: (1) the spherical video is projected onto a 2D plane using some projection method; and (2) the projected 2D video is encoded using conventional video codecs. An example of a typically used projection method is called the equirectangular projection, which uses the following equations to map a point P with coordinate ($\theta$, $\varphi$) on a sphere to a point P with coordinate (u, v) on a 2D plane, as shown in FIG. 1.

$$u = \frac{\phi}{2\pi} + 0.5$$
$$v = 0.5 - \frac{\theta}{\pi}$$

Currently, the majority of 360° video applications and services encode the entire 360° video into a standard compliant stream for progressive downloading or adaptive streaming. Delivering the entire 360° video to clients allows low-latency rendering (a client has access to the entirety of the 360° video content and can choose to render the portion that the user wants to see without further constraint). From the server's perspective, the same streams can support multiple users with possibly different viewports. On the down side, however, because the entire 360° video has to be encoded in high quality (e.g., 4K at 60 fps or 6K at 90 fps per eye), the video size would be tremendously high, incurring high transmission bandwidth when the video is delivered. At the client side, much of this high bandwidth consumption during delivery will be wasted, because the user only watches a small portion (the target viewport) of the entire picture.

In order to reduce the bandwidth requirement, alternative projection methods could be used to convert a 360° video to 2D planar video. For example, instead of the typical equirectangular projection, other geometric projection methods, such as pyramid-map, cube-map and offset cube-map, etc., may be used to represent the spherical video with less data. The cube-map projection method, for example, generally saves 20% of pixels compared to equirectangular projection, because it introduces less warping. Other projection methods, such as pyramid projection, may further subsample pixels that are not likely to be watched by the viewer to reduce the size of the projected 2D video.

An alternative to storing and delivering the entire 360° video between the server and the client is to use viewport-specific representations. Some projection methods, for example cube-map or pyramidal projection, can provide uneven quality representations for different viewports (that is, some viewports may be represented in higher quality than other viewports). In this case, in order to support all viewports of the spherical video, multiple versions of the same video with different target viewports may be generated and stored at the server side. For example, in Facebook's implementation of VR video delivery, an offset cube-map format may be used. The offset cube-map gives highest resolution (and hence highest quality) to the front viewport, lowest resolution (and hence lowest quality) to the back view, and intermediate resolution (and hence intermediate quality) to the side views. In order to accommodate a client's request for different viewports of the same content, the server will store multiple versions of the same content, for example a total of 150 different versions (30 viewports times 5 resolutions for each viewport) of the same content. Then, during delivery in a streaming session, the client may request the specific version corresponding to its current viewport, which will be delivered by the server. Although such viewport adaptive streaming method saves transmission bandwidth, its disadvantages include increased storage requirements on the server and potentially increased latency if/when the client changes viewport. The latency problem may be especially severe when such viewport changes are frequent.

SUMMARY

Described herein are systems and methods related to monitoring and reducing latency for viewport adaptive streaming of 360-degree video.

In an exemplary method of operating a head-mounted 360-degree video client device, a first viewport representation of a viewport-adaptive 360-degree video is displayed by the device to a user of the client device. The first representation is associated with a first viewing direction. While displaying the first viewport representation, the device detects that a head orientation of the user has changed to a second viewing direction associated with a second viewport. In response to the detected change in head orientation, the device retrieves a second viewport representation of the 360-degree video associated with the second viewport. The device commences display of the second viewport representation to the user. The device further measures a viewport switch latency between the detected change in head orientation and the commencement of display of the second viewport representation. The device sends to a server a latency report based at least in part on the measured latency.

In another exemplary method of operating a head-mounted 360-degree video client device, the device tracks a series of head orientations of a user, each head orientation corresponding to one of a plurality of respective viewport representations of a viewport-adaptive 360-degree video. The device adaptively requests the viewport representations corresponding to the tracked head orientations. The device receives and displays the requested viewport representations to the user. The device further sends, to a metrics server, a viewport request report, wherein the viewport request report is based on a number of requests made for the respective viewport representations.

In some embodiments, methods of viewport adaptive streaming employ dual-buffer segment scheduling. In one such embodiment, there is a method comprising initiating a viewport adaptive streaming of a 360-degree video from a server to a head-mounted display (HMD). The method also includes displaying a first segment at a first time based at least in part on a first orientation of the HMD at the first time, wherein the first orientation is associated with a first viewport. The method also includes requesting at least a first base buffer segment for inclusion in a base buffer based at least in part on the first viewport, wherein the first base buffer segment has a presentation time after the first segment. The method also includes determining a change in orientation of the HMD from the first orientation to a second orientation at a second time after the first time, wherein the second orientation is associated with a second viewport. The method also includes requesting, prior to the presentation time of the first base buffer segment, a first viewport buffer segment based on the second viewport, wherein the first viewport buffer segment has the same presentation time as the first base buffer segment. The method also includes displaying a second segment at the presentation time, wherein the second segment is either the first viewport buffer segment or the first base buffer segment.

In one embodiment, there is a method comprising initiating a 360-degree video stream from a server to a user head-mounted device (HMD). The method also includes requesting at least a first segment for inclusion in a base buffer. The method also includes requesting at least a second segment for inclusion in a viewport buffer. The method also includes displaying at least one segment from either the base buffer or the viewport buffer, based at least in part on a current orientation of the HMD.

In one embodiment, there is a method comprising estimating a bandwidth (BW) for a 360-degree video stream from a server to a user head-mounted device (HMD). The method also includes detecting a target viewport segment. The method also includes determining that there is not a base buffer underflow. The method also includes, in response to a determination that $$\left(\frac{S}{t}\right) \leq BW \leq \left(\frac{S}{t}\right) + \Delta,$$

where S is a size of the target viewport segment, t is a time between a current time and a next presentation time, and $\Delta$ is a bandwidth margin preserved to avoid potential mismatch: downloading the target viewport segment to a viewport buffer. The method also includes otherwise downloading the target viewport segment to a base buffer.

In one embodiment, there is a method of dual-buffer scheduling for tile-based viewport adaptive streaming of 360-degree video, wherein a base buffer is populated with at least one low quality tile representation and a viewport buffer is populated with at least one high quality viewport representation based at least in part on a detected orientation of a head-mounted display.

In one embodiment, there is a method of reducing switch latency for streaming of 360-degree video to a head-mounted display, comprising partial download scheduling.

In one embodiment, there is a method comprising initiating a viewport adaptive streaming of a 360-degree video from a server to a head-mounted display (HMD). The method also includes displaying a first segment at a first time based at least in part on a first orientation of the HMD at the first time, wherein the first orientation is associated with a first viewport. The method also includes requesting and beginning downloading of at least a first download segment and a second download segment, wherein the first download segment is associated with the first viewport, and the second download segment is associated with a second viewport, wherein the second viewport is determined based at least in part on the first viewport, and wherein the first and second download segments have a presentation time after the first segment. The method also includes determining a change in orientation of the HMD from the first orientation to a second orientation at a second time after the first time and prior to the presentation time, wherein the second orientation is associated with at least the second viewport. The method also includes at a previously determined time prior to the presentation, canceling the downloading of at least the first download segment. The method also includes rendering the second download segment to the HMD.

Disclosed in a further exemplary embodiment is a method of operating a 360-degree video client device, such as an HMD, a tablet computer, as smartphone, or other display device. In the method, a first viewport representation of a viewport-adaptive 360-degree video is displayed. To a user of the client device. The first representation is associated with a first viewing direction. While displaying the first viewport representation, the client detects that a viewing direction of the user has changed to a second viewing direction associated with a second viewport. In embodiments using an HMD, detection of a change of viewing direction may be made by detecting a change in head orientation (e.g. using accelerometers, gyros, and/or camera components of the HMD). In embodiments using other client devices such as tablet computers or smartphones, the detection of the change in viewing direction may be made based on a change in orientation of the device and/or on a scrolling input from the user (e.g. a user swiping across a touch screen surface to change viewing direction). In response to the detected change in the viewing direction, the client retrieves a second viewport representation of the 360-degree video associated with the second viewport and displays the second viewport representation to the user. The client also measures a viewport switch latency between the detected change in the viewing direction and the display of the second viewport representation. The client sends to a server a latency report based at least in part on the measured latency.

In some such embodiments, a plurality of viewport switch latencies are measured, and the latency report includes a maximum viewport switch latency from among the plurality of viewport switch latencies. In some embodiments, a plurality of viewport switch latencies are measured, and the latency report includes a mean (or alternatively a median) viewport switch latency from among the plurality of viewport switch latencies. The latency report may be sent to a DASH-Aware Network Element (DANE) in a Server and Network Assisted DASH (SAND) message. In some embodiments, the viewport representations are retrieved from the same server to which the latency report is sent.

Disclosed in a further exemplary embodiment is a method of operating a 360-degree video client device, such as an HMD, a tablet computer, as smartphone, or other display device. The client device tracks a series of viewing directions of a user, with each viewing direction corresponding to one of a plurality of respective viewport representations of a viewport-adaptive 360-degree video. The client device adaptively requests the viewport representations corresponding to the tracked viewing directions, and the client receives and displays the requested viewport representations to the user. The client further sends, to a metrics server, a viewport request report, wherein the viewport request report is based on a number of requests made for the respective viewport representations.

In some such embodiments, the viewport representations are requested from at least one DASH-Aware Network Element that is different from the metrics server.

In some such embodiments, the viewport request report indicates, for each of a plurality of the viewport representations, a number of requests made for the respective representation. In some embodiments, the viewport request report identifies a most-viewed viewport representation for at least one time interval.

In some embodiments, there is a system comprising a processor and a non-transitory storage medium storing instructions operative, when executed on the processor, to perform functions such as those set forth herein.

BRIEF DESCRIPTION OF THE DRAWINGS

A more detailed understanding may be had from the following description, presented by way of example in conjunction with the accompanying drawings, wherein:

FIG. 17 illustrates a diagram of one embodiment of dual-buffer scheduling for tile-based streaming.

FIG. 18 illustrates a diagram of one embodiment of dual-buffer scheduling for layer-based streaming.

DETAILED DESCRIPTION

A detailed description of illustrative embodiments will now be provided with reference to the various Figures. Although this description provides detailed examples of possible implementations, it should be noted that the provided details are intended to be by way of example and in no way limit the scope of the application.

Dynamic Adaptive Streaming over HTTP (DASH).

HTTP streaming has become a dominant approach in commercial deployments. For instance, streaming platforms such as Apple's HTTP Live Streaming (HLS), Microsoft's Smooth Streaming (SS), and Adobe's HTTP Dynamic Streaming (HDS) all use HTTP streaming as their underlying delivery method. A standard for HTTP streaming of multimedia content would allow a standard-based client to stream content from any standard-based server, thereby enabling interoperability between servers and clients of different vendors. MPEG Dynamic Adaptive Streaming over HTTP (MPEG-DASH) is a delivery format that provides end users with a high-quality video experience by dynamically adapting to changing network conditions. DASH is built on top of the ubiquitous HTTP/TCP/IP stack. It defines a manifest format called the Media Presentation Description (MPD) and defines segment formats for ISO Base Media File Format and MPEG-2 Transport Streams.

Dynamic HTTP streaming calls for various bitrate alternatives of the multimedia content to be available at the server. In addition, the multimedia content may consist of several media components (e.g., audio, video, text), each of which may have different characteristics. In MPEG-DASH, these characteristics are described by Media Presentation Description (MPD).

Figure 1:
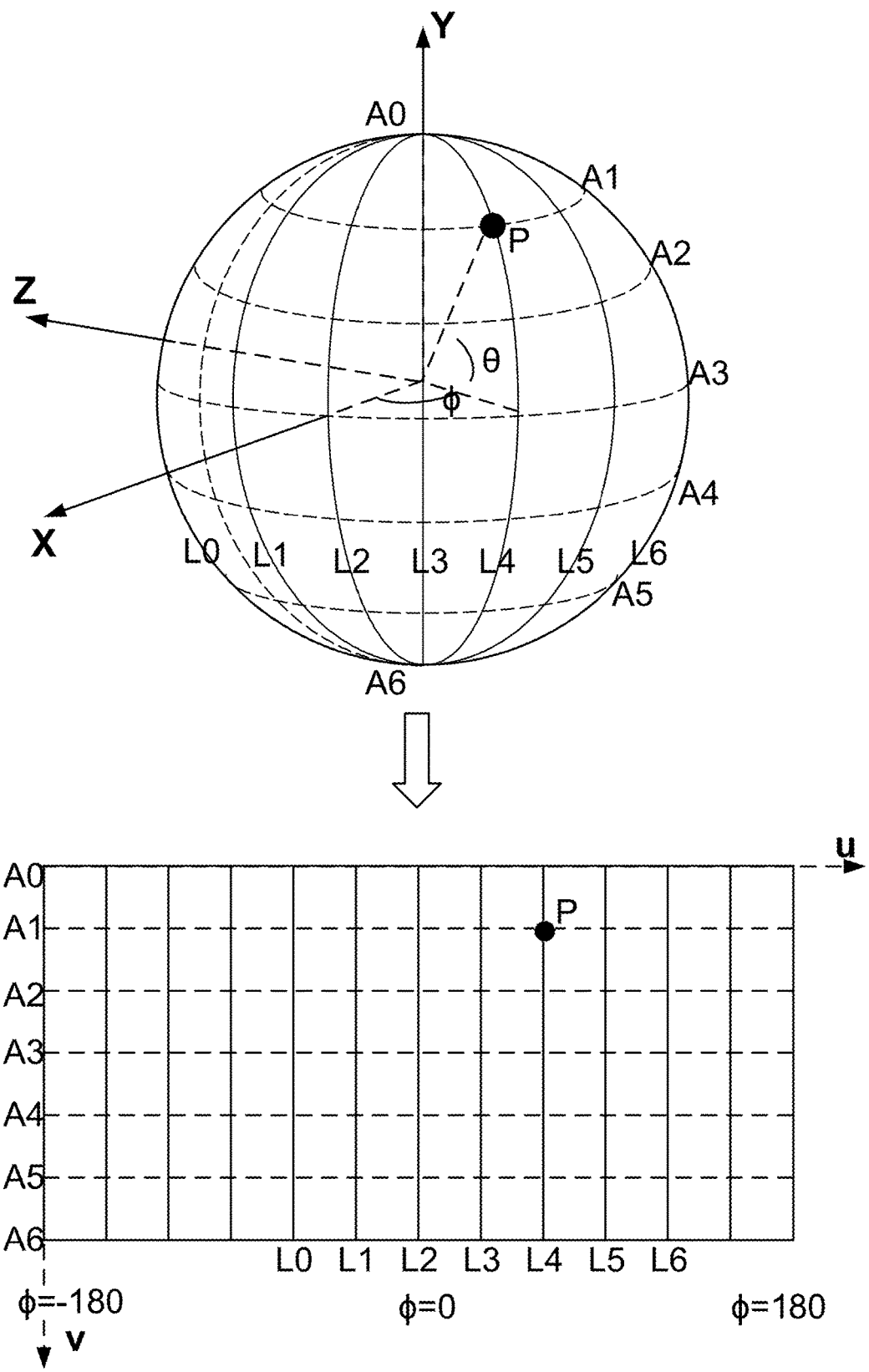
FIG. 1 depicts an example of equirectangular projection from a sphere to a 2D planar.
Figure 2:
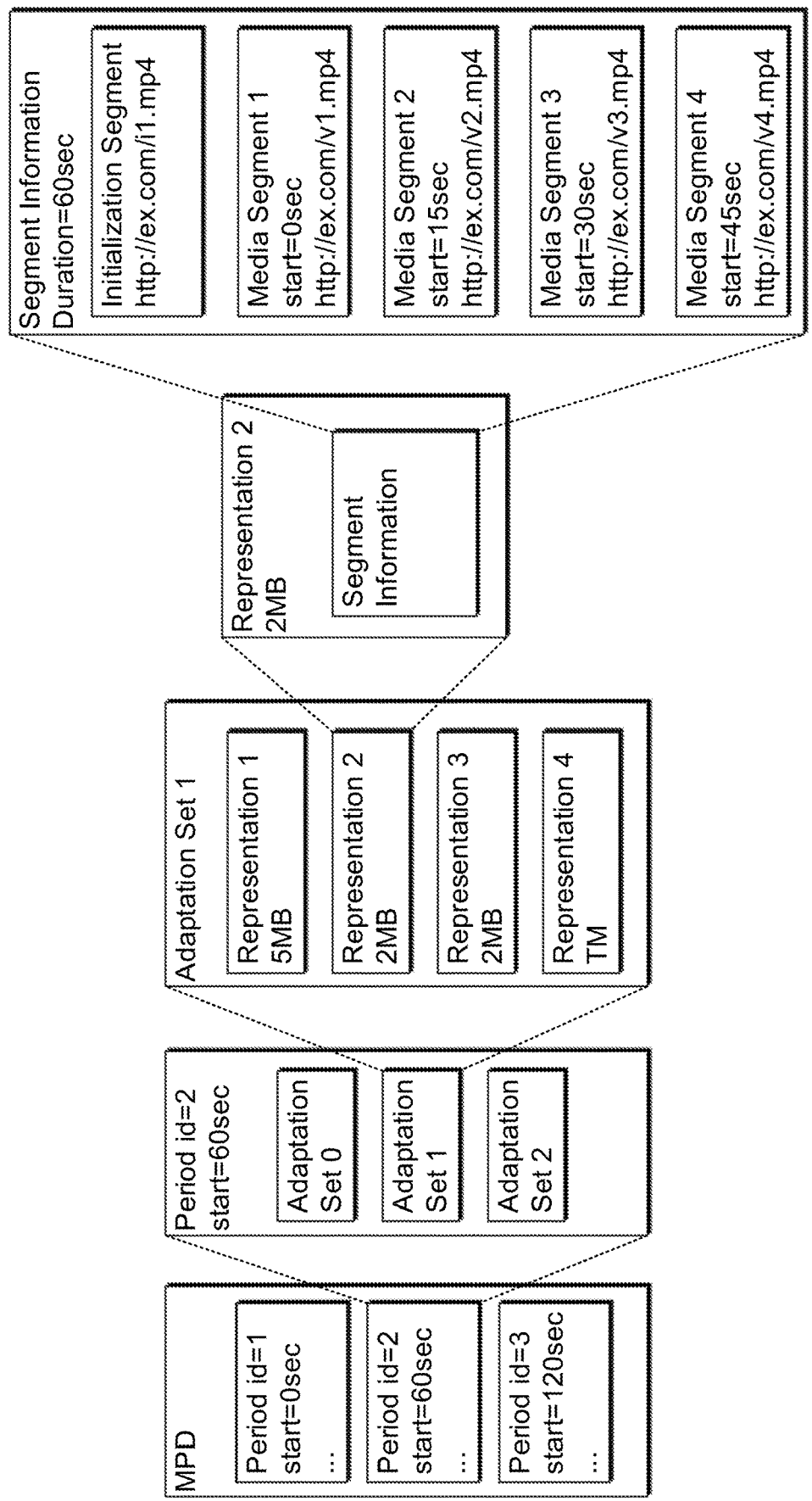
FIG. 2 depicts an example of a MPD hierarchical data model.

The MPD is an XML document that contains metadata used by a DASH client to construct appropriate HTTP- URLs to access video Segments (as described below) in an adaptive manner during streaming sessions. FIG. 2 illustrates one example of the MPD hierarchical data model. The MPD describes the sequence of periods, where a consistent set of encoded versions of the media content components does not change during a period. Each period has a starting time and duration and is composed of one or multiple adaptation sets.

An adaptation set represents a set of encoded versions of one or several media content components sharing the identical properties such as the language, the media type, the picture aspect ratio, the role, the accessibility, the viewpoint and the rating property. For instance, an adaptation set may contain different bitrates of the video component of the same multimedia content. Another adaptation set may contain different bitrates of the audio component (e.g., lower quality stereo and higher quality surround sound) of the same multimedia content. Each adaptation set usually includes multiple representations.

A representation describes a deliverable encoded version of one or several media components, varying from other representations by bitrate, resolution, number of channels or other characteristics. Each representation consists of one or multiple segments. The attributes of a representation element such as @id, @bandwidth, @qualityRanking, and @dependencyId are used to specify the properties of the associated representation A Segment is the largest unit of data that can be retrieved with a single HTTP request. Each segment has a URL, which may identify an addressable location on a server. The segment can be downloaded using HTTP GET or HTTP GET with byte ranges.

To use this data model, the DASH client parses the MPD XML document, selects a collection of adaptation sets suitable for its environment based on information provided in each of the adaptation set elements. Within each adaptation set, the client selects one representation, typically based on the value of the @bandwidth attribute, but also taking into account client decoding and rendering capabilities. The client downloads the initialization segment of the selected representations and then accesses the content by requesting entire segments or byte ranges of segments. Once the presentation has started, the client continues consuming the media content by continuously requesting media segments or parts of media segments and playing content that according to the media presentation timeline. The client may switch representations taking into consideration updated information from its environment. The client should play the content continuously across periods. Once the client is consuming media contained in the segments towards the end of the announced media in the representation, then the media presentation may be terminated, a new period may be started, or the MPD may be re-fetched.

DASH standard part 5, Server and Network assisted DASH (SAND), specifies messages between DASH clients and network elements or between various network elements for the purpose of improving efficiency of streaming sessions by providing information about real-time operational characteristics of networks, servers, proxies, caches, CDNs as well as DASH client's performance and status.

Figure 3:
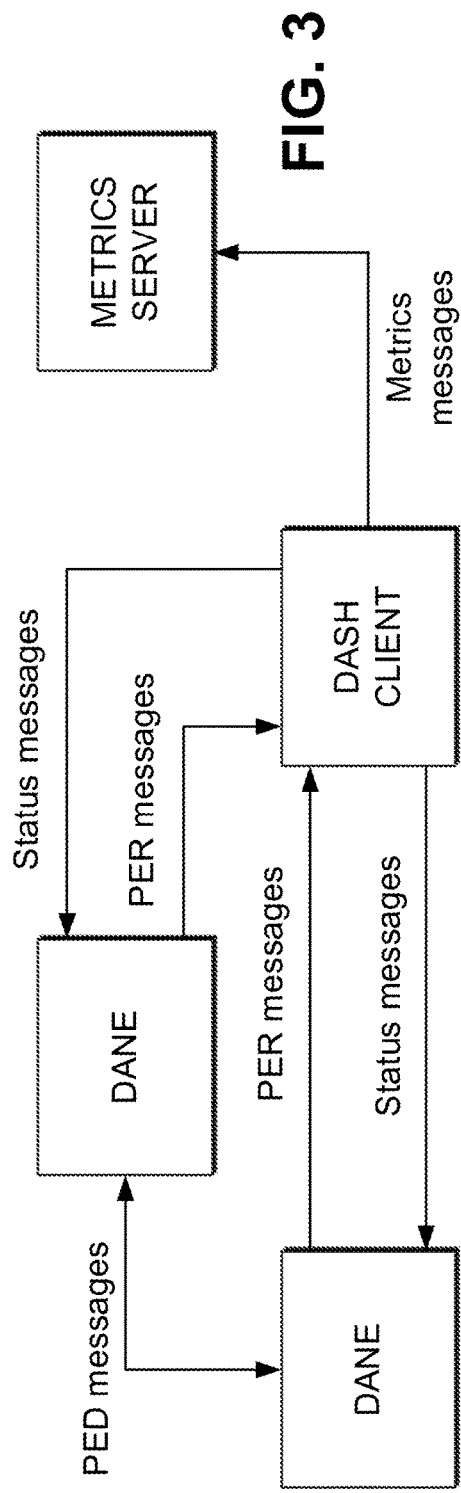
FIG. 3 illustrates four kinds of SAND messages exchanged between network elements and client.

FIG. 3 illustrates four kinds of SAND messages exchanged between network elements and client.

Parameters Enhancing Delivery (PED) messages are exchanged between DASH aware network elements (DANE).

Parameters Enhancing Reception (PER) messages are sent from DANEs to DASH clients.

Status messages are sent from DASH clients to DANEs. The status message provide real-time feedback from the client to DANEs in order to support real-time operations.

Metrics messages are sent from DASH clients to a metrics server. The metrics message provide a summary of the session or longer time intervals.

Viewport Adaptive Streaming.

Viewport adaptive streaming methods deliver the viewport region in high quality and the other regions in low quality in order to reduce the transmission bandwidth. There are several kinds of adaptive viewport streaming approaches, including the frame-based approach, the tile-based approach, and the layer-based approach.

Figure 4:
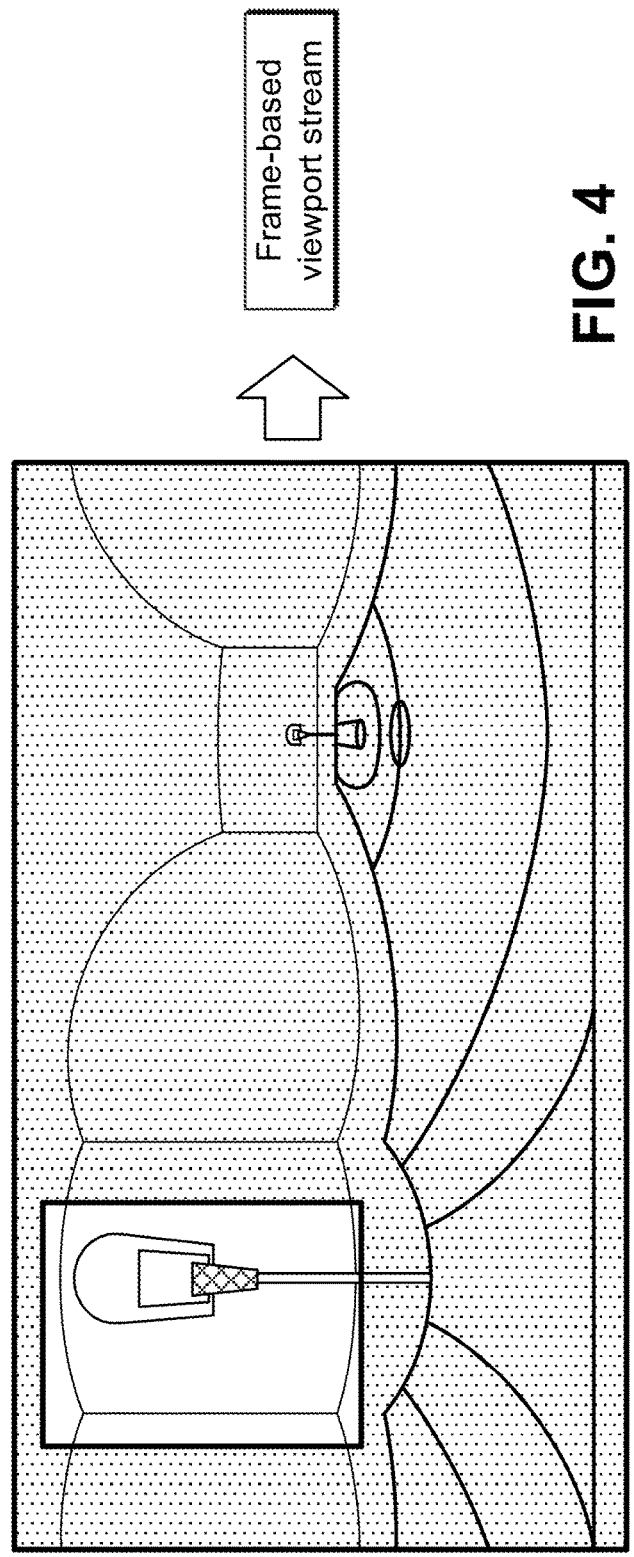
FIG. 4 illustrates an embodiment of a frame-based viewport frame where the center region is coded in high quality but the other regions are coded in lower quality.

The frame-based viewport adaptive streaming approach encodes an entire 360 video into a single bitstream, with the viewport region in the bitstream being coded in high quality and the other regions of the same bitstream being coded in low quality. Such an approach can be achieved by either pre-processing or rate control. The aforementioned projection methods such as pyramidal and offset cube mapping methods are one kind of pre-processing. The similar approach to apply the low-pass filtering on non-viewport region before the encoding can also reduce the visual quality of non-viewport regions. The same result can also be achieved by assigning more bits to the viewport region and fewer bits to other regions via rate control during the encoding. FIG. 4 illustrates an embodiment of a frame-based viewport frame where the center region is coded in high quality but the other regions are coded in lower quality. The streaming server stores multiple representations of the same content with different targeting viewport region at different bitrate, and the client requests the particular representation based on the head orientation and available bandwidth. The client may switch among different representation segments when the head orientation changes.

Figure 5:
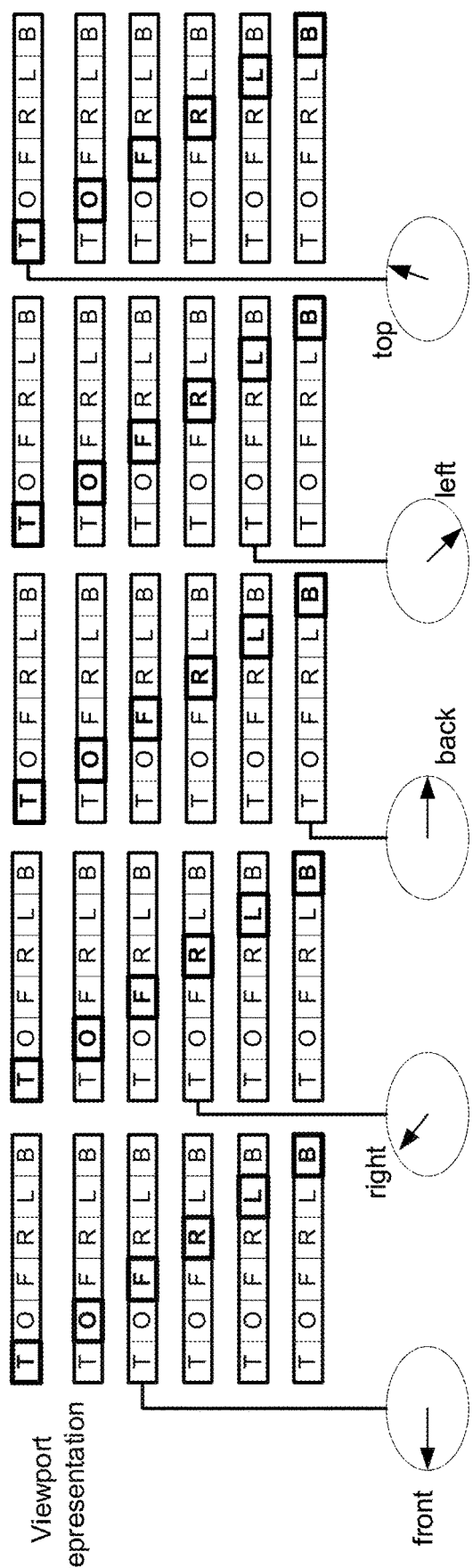
FIG. 5 illustrates an example of a frame-based viewport adaptive streaming approach.

FIG. 5 illustrates an example of such a frame-based viewport adaptive streaming approach. The server has six representations, each of which includes all viewports, including front viewport (F), right viewport (R), back viewport (B), left viewport (L), top viewport (T) and bottom viewport (O), with one particular viewport in high quality (the high-quality viewport is bolded in FIG. 5). When the user is watching the front viewport, the segment with the high quality front viewport is delivered to the user. When the user is moving toward the right viewport, the segment with high quality right viewport is delivered to the user, and so on so forth.

Figure 6:
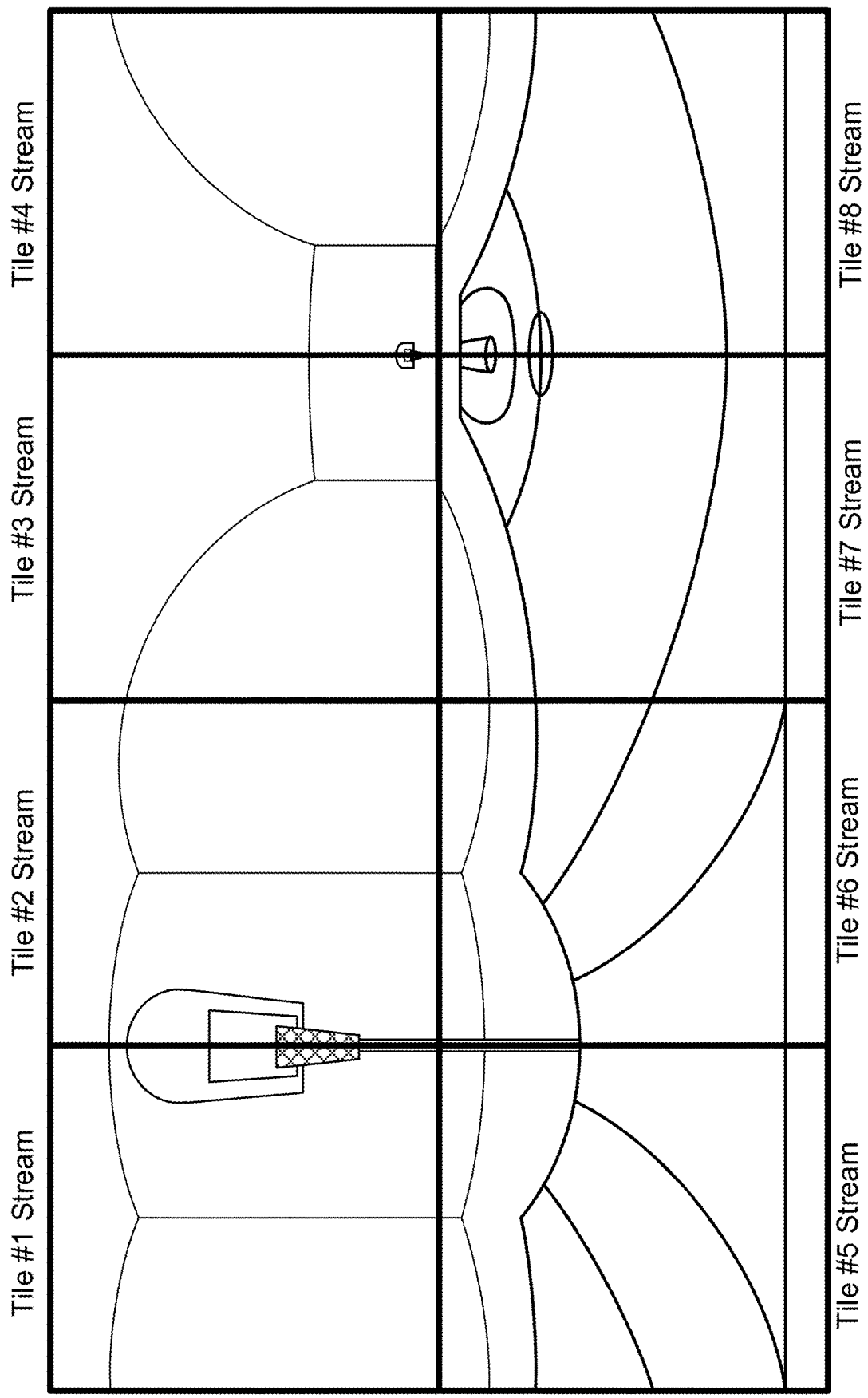
FIG. 6 illustrates an example of a tile-based viewport adaptive streaming partitioning approach.

The tile-based viewport adaptive streaming approach divides a 360° video projection frame into a number of tiles, as shown in FIG. 6. Each tile can be independently encoded into multiple quality level representations. The client may request different quality level representations of each tile based on the head orientation and the available bandwidth, and then compose all tiles together for rendering. The tile-based approach has less storage cost compared with the frame-based approach, but it requires additional composition processing on the client side.

Figure 7:
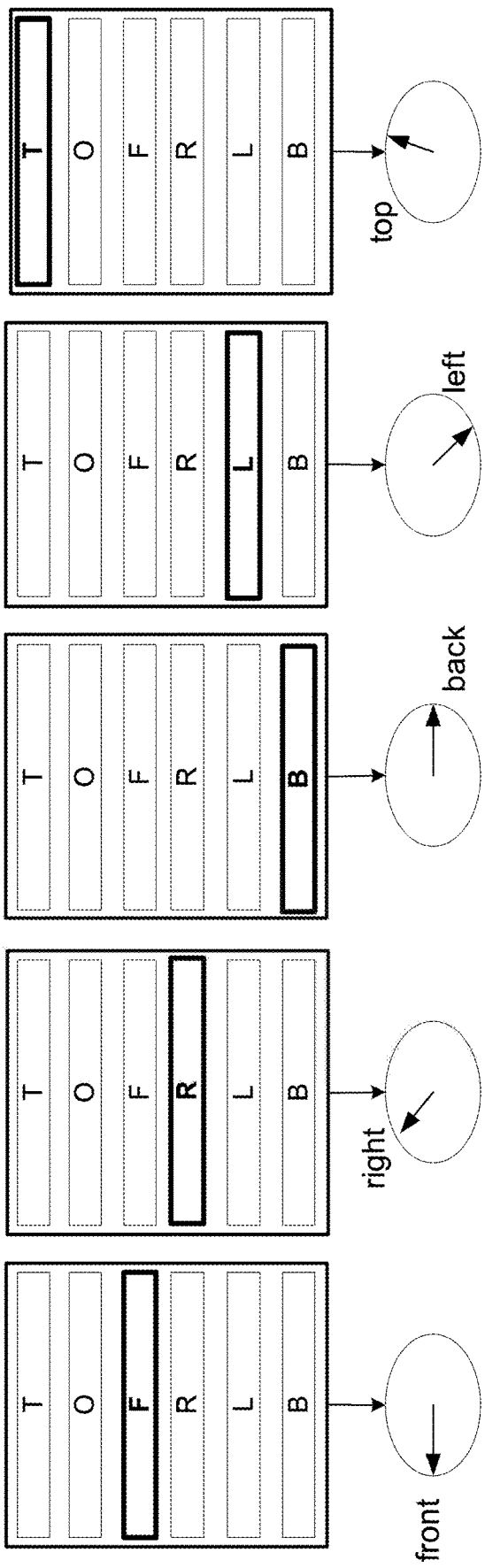
FIG. 7 illustrates a tile-based viewport adaptive streaming example.

FIG. 7 illustrates a tile-based viewport adaptive streaming example. Based on the head orientation, the client may request the corresponding viewport tile representation in high quality (bolded in FIG. 7) and the remaining tiles in low quality. All tiles can be composed into a full 360° video projection frame to be rendered to the user.

Figure 8:
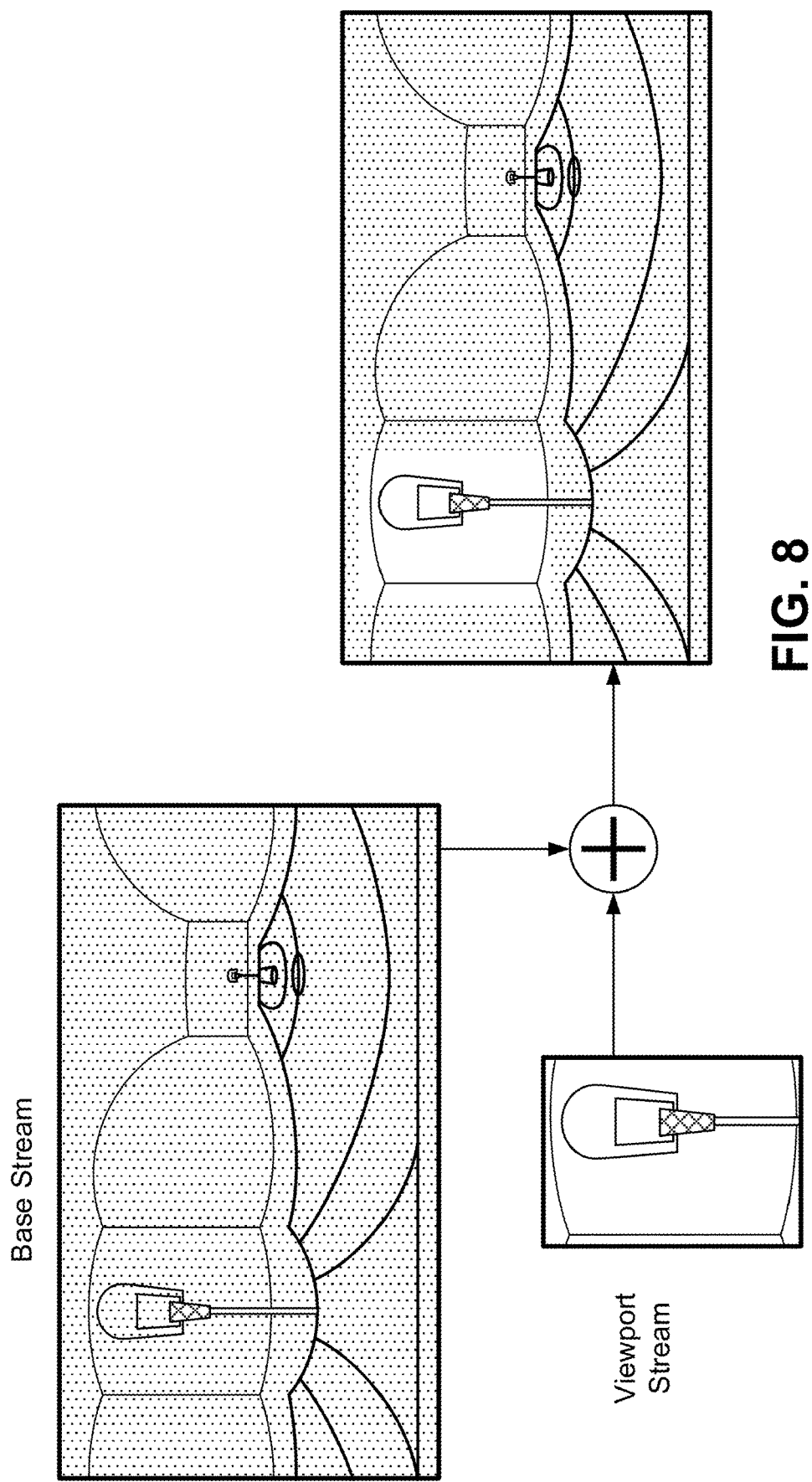
FIG. 8 illustrates a layer-based viewport overlay composition example.

The layer-based approach encodes the entire 360° video into a low quality representation as base and encodes each individual viewport into different quality levels. The client always requests the base representation and a particular viewport representation based on the head orientation, and then overlays the high quality viewport on top of the base frame for the rendering. FIG. 8 is a layer-based overlay composition example.

Figure 9:
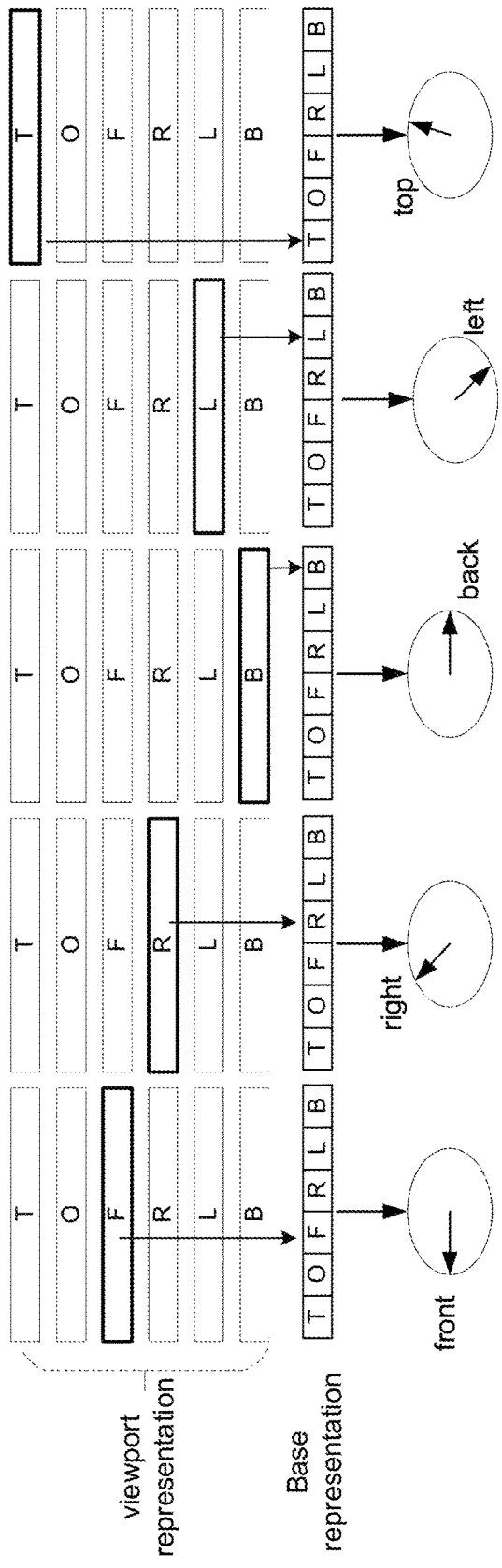
FIG. 9 illustrates a layer-based viewport adaptive streaming example.

FIG. 9 illustrates such a layer based viewport adaptive streaming example. The low quality base representation includes all viewports, and each viewport (T, O, F, R, B, L) is coded into high quality representation respectively. Based on the head orientation, the low quality base representation and one particular viewport representation are delivered to the user to compose the 360° video for rendering. Compared with the tile-based approach, the layer-based approach may use fewer representation copies stored on the server side. The viewport representation can be coded independently from the base representation, or can be coded as scalable enhancement layer, such as the scalable extension of HEVC (SHVC), which depends on the base representation so that the viewport representation size can be reduced.

Figure 10:
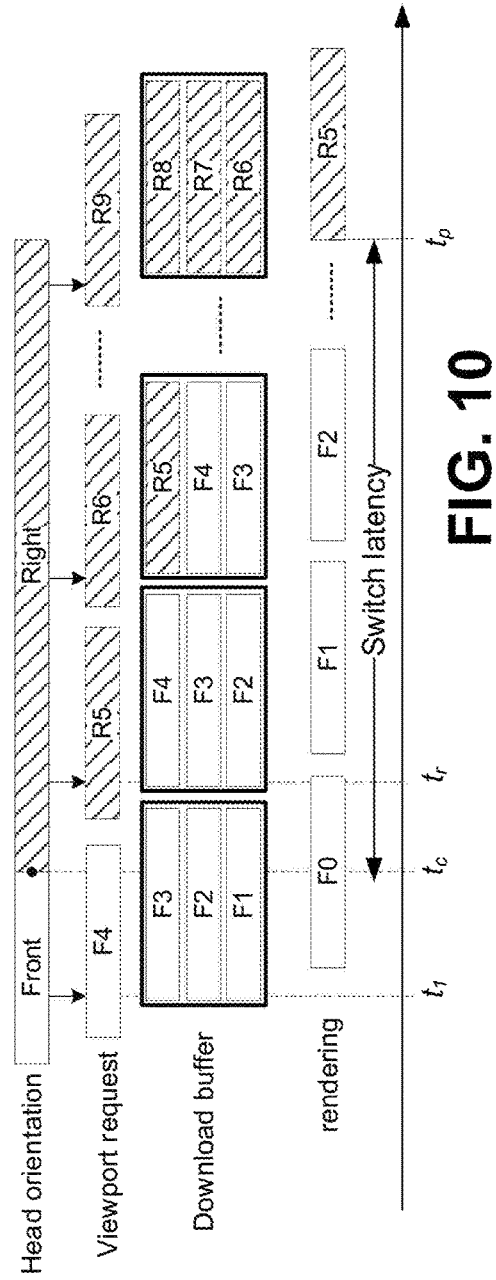
FIG. 10 illustrates an example of viewport adaptive streaming and switch latency.

The viewport adaptive streaming approach reduces the transmission bandwidth but requires more storage and introduces latency when switching between different viewports. Because only the target viewport is in high quality and the rest of the video is in low quality, the latency between the viewport change and the rendering of the corresponding viewport representation may affect user experience severely. FIG. 10 is a viewport adaptive streaming example. Denote the time when the user changes his viewing direction from one viewport to a different viewport as $t_c$; the time when the user requests the segment of the different viewport as $t_r$, and the time when the different viewport segment is presented as $t_p$. FIG. 10 shows the user is switching from front viewport (F) to right viewport (R) at time $t_c$ when one front viewport segment (F0) is being rendered. The download buffer holds three front viewport segments (F1, F2 and F3), and one more segment (F4) was being downloaded. As a result, the first right viewport segment R5 is to be requested at $t_r$, and the user may not watch the right viewport segment R5 until $t_p$. The time interval between $t_c$ and $t_p$ is the switching latency. The negative user experience can be resolved with shorter segment length, but this may reduce coding efficiency as well. Another method to reduce such switching latency is to reduce the download buffer size to hold fewer segments; however, the smaller downloading buffer size may affect streaming quality adaptation as well, for example by causing buffer underflow to happen more frequently.

The switch latency issue is present in all three aforementioned viewport adaptive streaming approaches. In this disclosure, systems and methods are set forth to address the switching latency and other issues.

Exemplary Dual-Buffer Segment Scheduling Methods.

Figure 11:
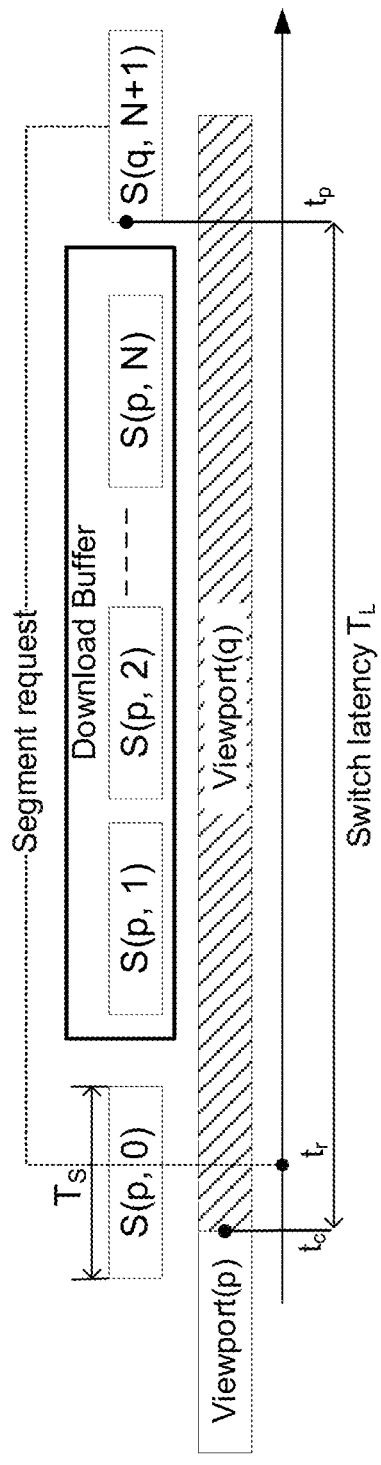
FIG. 11 illustrates a viewport adaptive streaming segment request example.

The switch latency depends on factors such as the segment length, the download buffer size, the orientation detection frequency and segment request time. Because the viewport may be constantly changing, each segment stored in the buffer may not match the current viewport when it is being rendered. It may not worth to spend bandwidth to download all these segments in advance, but sufficient buffer fullness level shall be maintained to prevent buffer underflow. FIG. 11 is a simplified example as compared to the example of FIG. 10. The viewport segment is defined as S(i,j) for j-th segment of i-th viewport. Each segment length is fixed as $T_S$, and the download buffer may hold N segments. The head orientation changes from p-th viewport to q-th viewport at $t_c$ when segment S(p,0) is playing. The client decides to request S(q, N+1) at $t_r$ and the presentation time for S(q, N+1) is $t_p$. The time interval between $t_c$ and $t_p$ is the switch latency $T_L$, where $(N)*T_s \le T_L \le (N+1)*T_s$.

Figure 12:
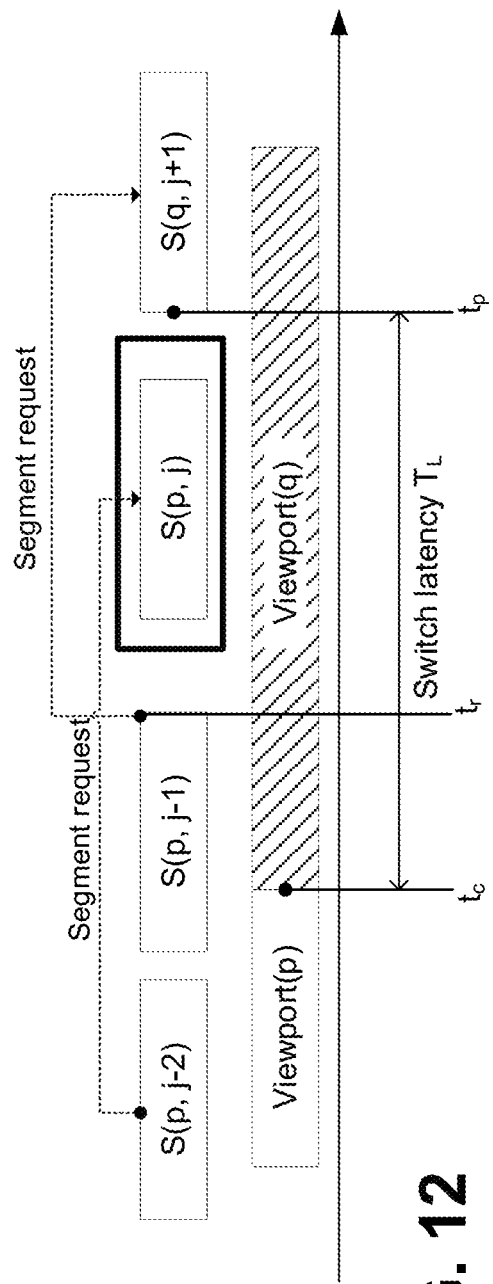
FIG. 12 illustrates a minimum switch latency example.

The streaming segment request usually occurs sequentially right after the previous segment download is finished. In such way, the segment can be selected appropriately based on the most recent bandwidth estimation. While for viewport adaptive streaming, the ideal segment request time, $t_r$, should be the same as $t_p$ so that the viewport segment downloaded can match the head orientation at presentation time ($t_p$). However, this calls for very high bandwidth. The reduction of the time interval between $t_r$ and $t_p$ is helpful for reducing the switching latency. As shown in FIG. 12, the switch latency can be reduced to less than or equal to $2*T_s$ by setting the buffer size to one segment, with the segment request occurring at the end of the playback of each segment.

In FIG. 12, the switch latency is equal to $2*T_s$ when the head orientation happens at the beginning of the rendering of the segment S(p, 0), and the switch latency is equal to $T_s$ when the head orientation happens at the end of the rendering of the segment S(p, 0). However, such small buffer size requires guaranteed sufficient network bandwidth (BW) to completely download a high quality viewport segment in time based on the following constraint to avoid buffer underflow.

$$BW \ge (S(q,j+1)/T_s) \qquad \text{Eq. 1}$$

where S(q, j+1) is the size of (j+1)-th segment of q-th viewport and $T_s$ is the segment length. The estimated bandwidth, $BW_{est}$, may not match the actual available bandwidth BW. When the estimated bandwidth is higher than BW, buffer underflow may occur when the bandwidth drops unexpectedly. Moreover, because the segment request occurs only once a segment download completes, the bandwidth estimation may not be up to date when the last segment download is finished way before the next segment request. In addition, the bandwidth utilization may not be efficient during the period when no segment is being fetched.

In order to prevent buffer underflow and reduce the switch latency, a dual-buffer segment scheduling approach is proposed herein for viewport adaptive streaming.

Figures 13, 14:
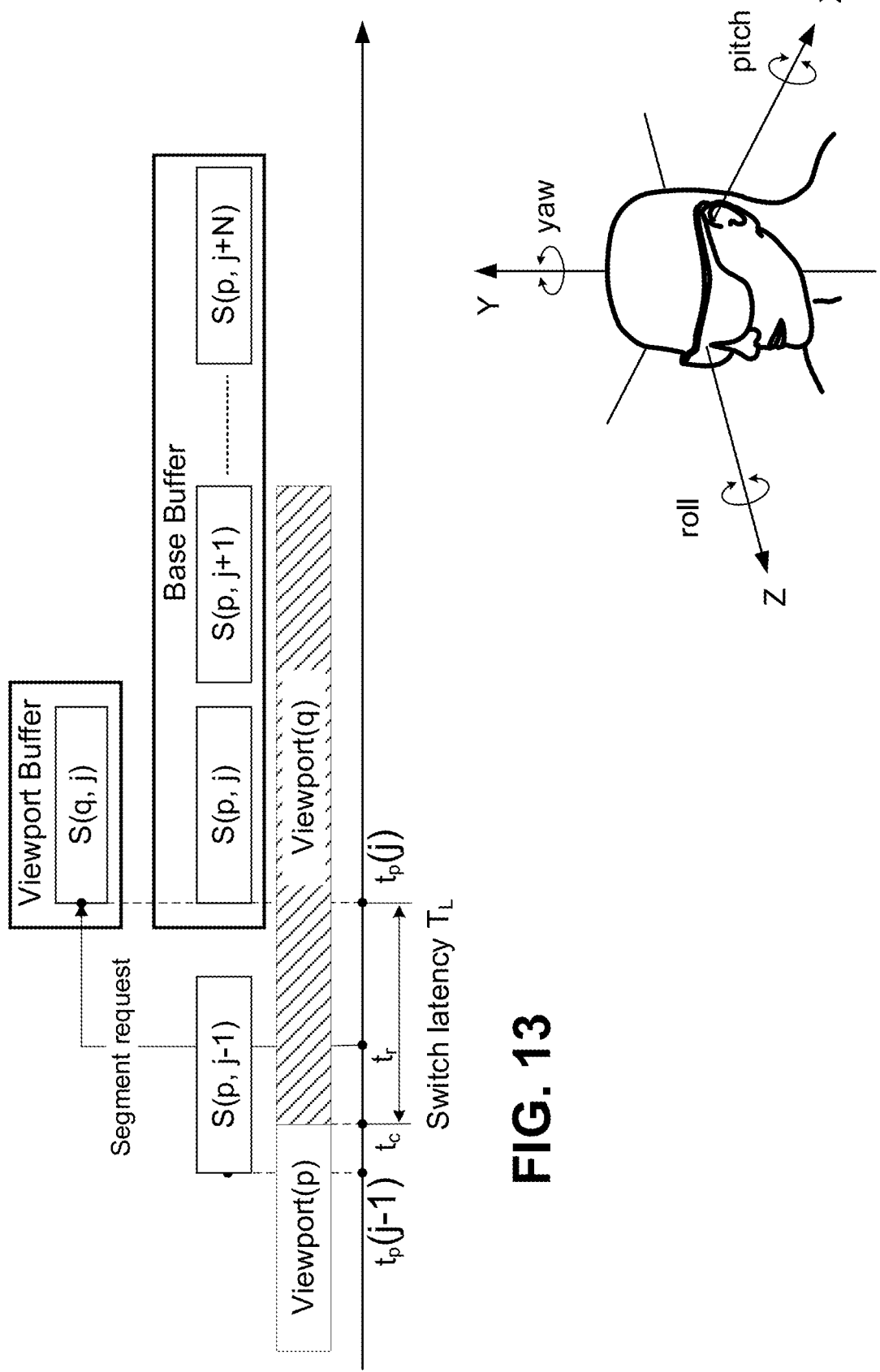
FIG. 13 illustrates one embodiment of a dual-buffer scheduling method for frame-based viewport adaptive streaming.
FIG. 14 illustrates one example of three degrees of freedom for an HMD.

FIG. 13 is a diagram of one embodiment of a dual-buffer scheduling method for the frame-based viewport adaptive streaming case. There are two buffers: a base buffer and a viewport buffer. The base buffer is similar to the regular streaming downloading buffer used to adapt to the bandwidth fluctuation and maintain an appropriate buffer fullness level to prevent buffer underflow or overflow. The viewport buffer stores the segment to be rendered immediately after the current segment is rendered in order to minimize the switch latency.

Because each segment in the download buffer may be fetched way before the most recent head orientation detection, the viewport of each segment may not match the current head orientation when it is rendered. Therefore, it may not be worth it to request the high quality high bitrate representations unless the head orientation prediction is reliable. The client may collect the user's head orientation data during playback, and analyze the orientation consistency in order to determine which quality level of segments shall be requested for the download buffer. When the head movement is slow or a particular high priority viewport is presented (e.g., a particular viewport may be marked as high priority by the film director or content provider for a certain time duration), the predicted viewport representation can be requested in high quality. Otherwise, low quality viewport representation is requested to maintain the buffer fullness level and save the bandwidth.

Denote head orientation at time t as V(t), the horizontal orientation range of V(t) is from −180° to +180° and the vertical orientation range of V(t) is from −90° to 90°. The quality level selection of a particular viewport representation in base buffer may depend on the factors such as head movement intensity, for example, via the measurement of 3 degrees of freedom (pitch, yaw and roll) during a period (e.g., 2 seconds). FIG. 14 shows a 3 degree of freedom HMD example. When the head changes in orientation through rotation about X (e.g., $\varphi$) and Y axes (e.g., $\theta$) less than a pre-defined degree threshold D ($\varphi$<D && $\theta$<D), the DASH client may request medium or high quality viewport segment due to slow head movement. Otherwise, the lowest rate representation segment may be requested. Another alternative embodiment is to determine the most viewed orientation from viewing history data analysis, and always request the segments of the most-viewed viewport.

Figure 15:
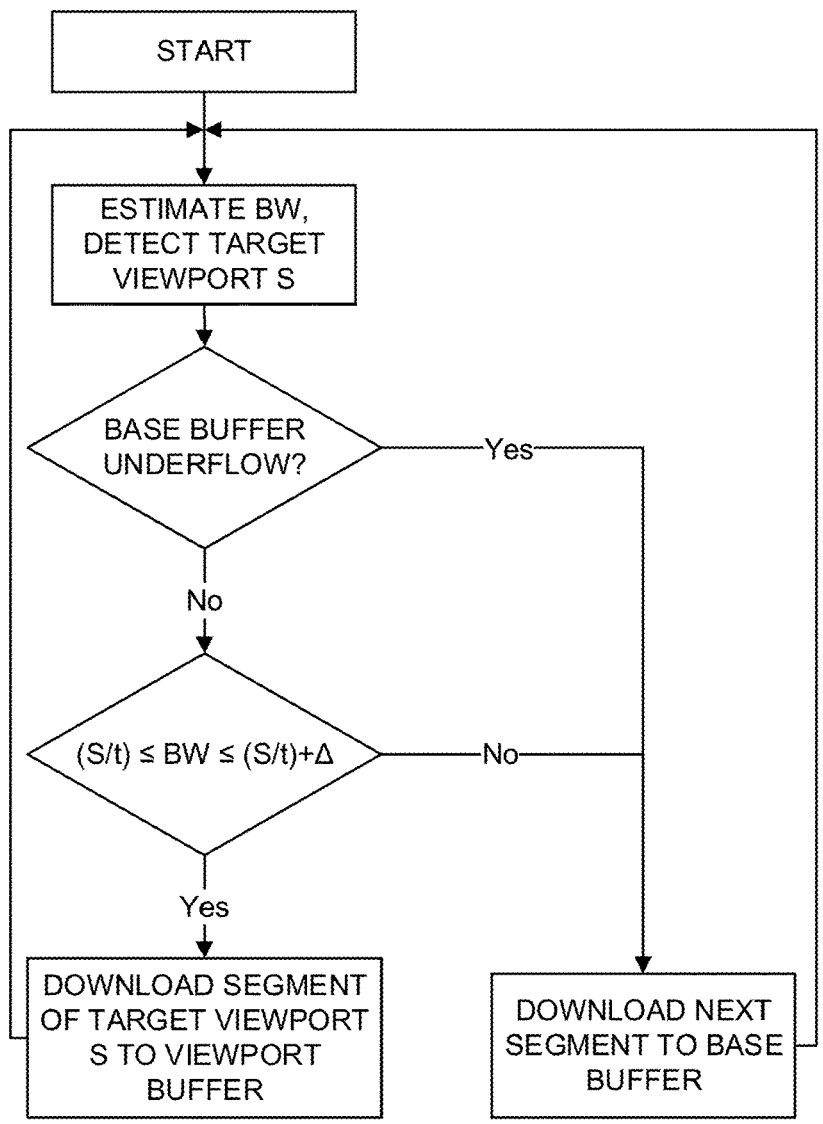
FIG. 15 illustrates a flowchart for one embodiment of dual-buffer scheduling.

The viewport buffer is used to store the target viewport segment to be rendered immediately after current rendering segment. Such segment is used to minimize the switch latency because it is requested based on the most recently detected head orientation. The request timing, $t_r$ as shown in FIG. 15, is critical for the switch latency. The smaller the interval between $t_r$ and $t_p(j)$, the more accurate the orientation detection is. However, small intervals may require high bandwidth to complete the download of the entire viewport target segment in time. If the request occurs too early, it may not catch the latest head orientation change but time to download the segment will be available. If the request occurs too late, the requested viewport may match the viewport orientation, but the corresponding segment download may not be finished in time.

Denote the presentation time for the j-th segment as $t_p(j)$ and, for the simplicity, $t_p(j)$ is assumed to be identical for the j-th segment of all viewports. The bandwidth is BW, the time head orientation changes is $t_c$, and the request for the j-th segment of the i-th viewport, S(i,j), occurs at $t_r$. In order to fetch the entire S(q,j), the following equation shall be satisfied.

$$BW \geq S(i,j)/(t_p(j)-t_r) \quad \text{Eq. 2}$$

$$t_r \leq t_p(j)-(S(i,j)/BW) \quad \text{Eq. 3}$$

Since there are two viewport segment candidates, S(p,j) and S(q,j), available in the base and viewport buffer, the client may select one of the segments to present based on the head orientation at $t_p(j)$ and remove another one from the buffer.

FIG. 15 shows the dual-buffer scheduling flowchart. S is the size of target viewport segment and t is the time distance between current time and the next presentation time. $\Delta$ is the bandwidth margin preserved to avoid potential mismatch between the estimated bandwidth (BW) and the real network bandwidth available.

Figure 16:
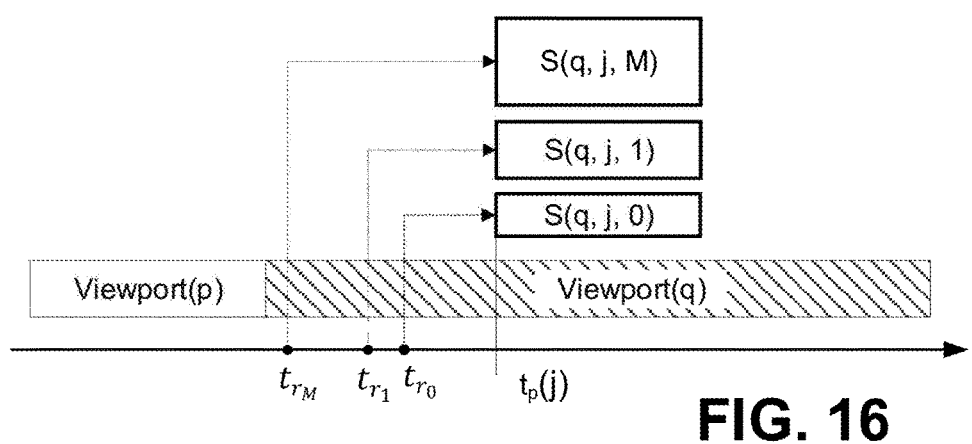
FIG. 16 illustrates a diagram of one embodiment of segment request timing.

In case there are multiple quality levels for each viewport segment, the j-th segment of i-th viewport at k-th quality level can be represented as S(i, j, k), where $$S(i,j,0)<S(i,j,1)<\ldots<S(i,j,k)<\ldots<S(q,j,M),$$

assuming there are M+1 quality levels of i-th viewport representation. The user may determine the quality level to request based on the available bandwidth as well as the head orientation change. Given the same available bandwidth BW, the client may prefer to select medium quality segment S(i, j, k) where k<M so that the request time $t_r$ can be closer to $t_p(j)$ if the head orientation keeps changing frequently. The client may select the highest quality segment S(i,j, M) at earlier time if the head orientation is consistent over the time. FIG. 16 shows an example in which different quality levels of the j-th segment of q-th viewport maps to different segment request time $t_{r_M}$ in order to complete the download before the presentation time $t_p(j)$.

In case the network bandwidth drops rapidly and the corresponding target viewport segment S(q,j,k) cannot be downloaded completely, the streaming client can retrieve the j-th segment from the base buffer for rendering without stalling the playback.

When the head orientation matches the viewport segment in the base buffer at $t_r$, the client may make a determination not to request the segment of the same viewport again, or the client may make a determination to request a higher quality segment of the same viewport. Once the target viewport segment download is completed, the client may continue requesting the subsequent segments to fill the base buffer.

The above proposed dual-buffer segment scheduling method is illustrated for frame-based viewport adaptive streaming case. However, the same method can also be used for tile-based and layer-based viewport adaptive streaming as well.

For tile-based viewport adaptive streaming, the base buffer holds all lower-quality tile representations, and the viewport buffer stores the particular high quality viewport representation depending on the latest head orientation detection at $t_r$. FIG. 17 shows an exemplary dual-buffer scheduling method for tile-based viewport adaptive streaming. For the sake of simplicity, only two quality levels are presented: $S_L(j, k)$ is denoted as the low quality $j^{th}$ segment representation for $k^{th}$ tile, and $S_H(j, p)$ is denoted as the high quality j-th segment representation for p-th tile. The client requests low quality tiles to fill the base buffer and requests high quality tile(s) at $t_r$, the number of high quality tiles being requested depending on the bandwidth available and the number of tiles within the target viewport. FIG. 17 shows two high quality tiles are requested for viewport q.

Due to the much smaller tile segment size compared to a frame-based segment, the required bandwidth to download high quality tiles can be much lower compared to frame-based viewport adaptive streaming. Therefore, the request time, $t_r$, can be much closer to $t_p(j)$ so that the head orientation detection is more accurate. The required bandwidth (BW) or the segment requesting time $t_r$ can be derived from the following equations, assuming that the total number of high quality tiles to be requested is K.

$$BW \geq \sum_{k=q}^{q+K} S(j,k)/(t_p(j)-t_r) \quad \text{Eq. 4}$$

$$t_r \leq t_p(j) - \left(\sum_{k=q}^{q+K} S(j,k)/BW\right) \quad \text{Eq. 5}$$

In another embodiment, not all low quality tiles need to be requested for the base buffer. The downloading priority of each tile may be determined by its distance from the previously detected target viewport. The previously detected viewport tile and its surrounding tiles which are highly likely to be viewed can be downloaded first into the base buffer, while the tiles far from the target viewport can be downloaded later or not downloaded at all depending on the bandwidth available and the head motion analysis. The priority of each tile (within or outside the viewport) may also be determined based on its importance, where the importance of a tile can be measured in a number of ways such as by the total amount of motion in the tile, contrast of the tile or other quality related features of the tile. The more important tiles can be downloaded first into the base buffer, while the less important tiles can be downloaded later or not at all depending on the bandwidth available and the head motion analysis. As a result, the bandwidth saved by downloading part of the tiles can be used to download more high quality tile segments. In the worst case, if the user is watching the tiles that are not available, the corresponding previously downloaded tile can be used to fill the spot.

In another embodiment, there may be multiple tiles in the viewport. Not all these tiles need to be requested in high quality or in the same quality. The more important tiles can be requested at the same or a higher quality and/or before the less important tiles, which will be requested at the same or a lower quality and/or after the more important tiles. The importance of a tile can be measured in a number of ways such as by the total amount of motion in the tile, contrast of the tile or other quality-related features of the tile. As a result, a better experience can be achieved by using the same or less amount of resources such as bandwidth.

For the layer-based viewport adaptive streaming approach, the base representation is preferably downloaded first to avoid buffer underflow. FIG. 18 shows the dual-buffer scheduling example for layer-based viewport adaptive streaming. The $j^{th}$ segment of base representation is denoted as $S_L(j)$, and the high quality $j^{th}$ segment of $q^{th}$ viewport is denoted as $S_H(j, q)$. Similar to the scheduling for tile-based streaming, one or multiple viewport segments can be downloaded to overlay on the base frame depending on the field of view and the bandwidth available. Equations (4) and (5) also apply to the layer-based streaming approach. In case the high quality viewport segment cannot be downloaded in time, the base representation can be used as fallback video for the presentation.

In case layer-based scalable 360° video representations are available, the client may also request an enhancement layer segment instead of an independent viewport segment for the viewport buffer using the dual-buffer scheduling method. The enhancement layer may cover part or all of the viewport of 360° video, and the scheduling scheme may request enhancement layer segment at earlier time ($t_r$) if the enhancement layer segment covers more viewports. Additional signaling, such as viewportId, may be used to identify the viewports included in the enhancement layer. In case the enhancement layer covers all viewports with identical quality, the request time $t_r$ may solely depend on the bandwidth because it is not viewport adaptive streaming any more.

Exemplary Partial Download Scheduling Methods.

Figure 19:
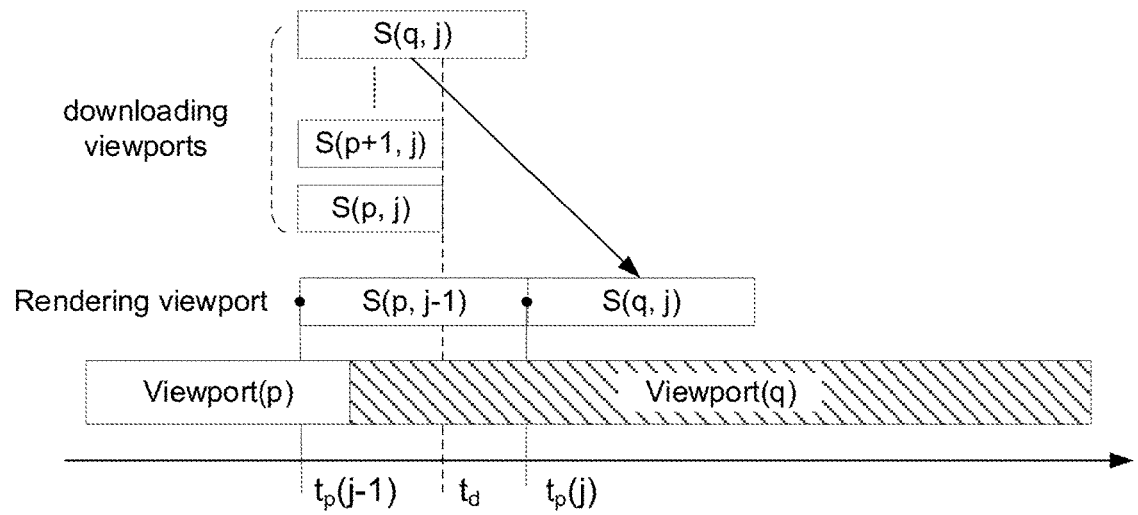
FIG. 19 illustrates a diagram of one embodiment of a method of partial download scheduling.

In another embodiment, an alternative method to reduce the switch latency may be partial download scheduling as shown in FIG. 19. In practice, part of the segment is downloaded for a number of identified viewports. For example, the viewport that matches the orientation detected at $t_p(j-1)$, e.g., $S(p,j)$, and its neighboring viewports, e.g., $S(p+1,j)$, $S(p+2,j)$, ..., $S(q,j)$. Such method assumes that the users motion is moderate and head orientation at $t_p(j)$ may match one of viewports next to $S(p,j)$. Selection of additional viewports may be based on the data analysis of the head's angular velocity and body movements as well in order to estimate the next target viewport orientation.

Existing streaming protocols allow the client to specify a number of bytes of the segment to download instead of downloading the entire segment. At a certain time, $t_d$, the final matched viewport segment $S(q,j)$ is determined for continuous download, while the download of the segments of the other viewports shall be terminated. As a result, the switching latency may be less than or equal to one segment length, $T_s$.

Such a partial download approach improves the viewport detection accuracy and minimizes the switching latency but may require extra bandwidth to partially download the segments of all potential viewports.

Figure 20:
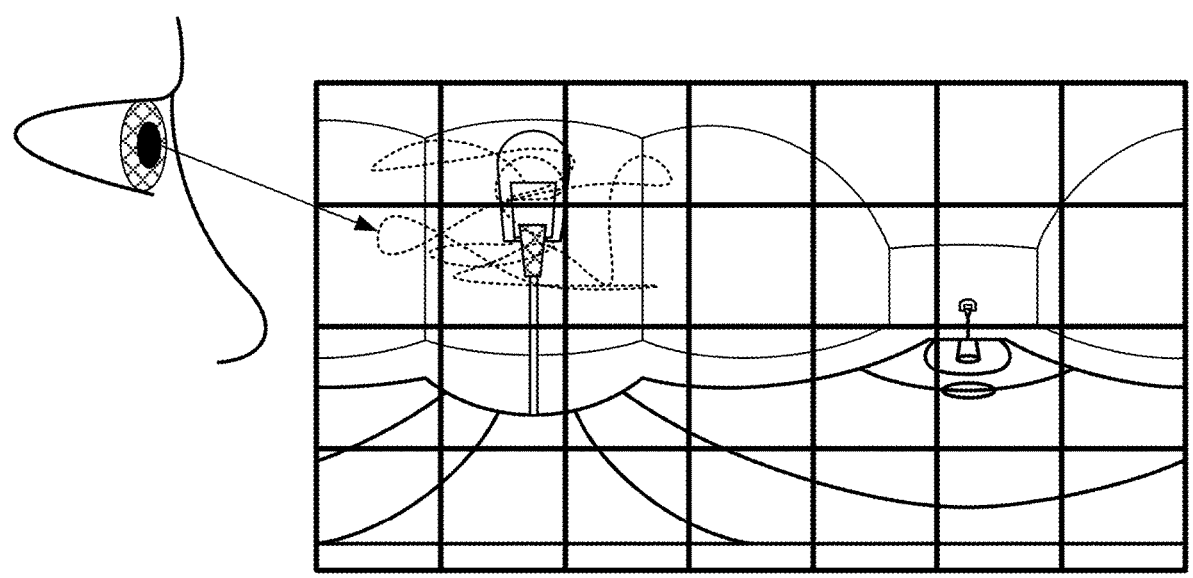
FIG. 20 illustrates one embodiment of a gaze tracking analysis.

Denote the average size of each viewport segment as S, and the partial downloaded data percentage as a. The number of viewports to be requested initially is denoted by N. The value of N depends on the users gaze tracking analysis and estimated bandwidth. The motion analysis may use the total number of viewports the user watched during a period to determine the value of N. For example, if the user viewing range crosses 3×2 viewports during the past 2 seconds as shown in FIG. 20, then the value of N may be set to six, and six segments of current viewport and its surrounding viewports may be requested. An alternative approach is to calculate how many viewport segments can be accommodated by the available bandwidth. For example, in case the average segment size is 1 MB and segment length is 2 seconds, a is set to 0.4 and 400 KB is to be downloaded per segment during the first 1 second, and then the value of N would be 10 when the available bandwidth is 4 Mbps. A combination of gaze tracking analysis and bandwidth estimation can be used as well to determine the value of N.

Denote the time to identify one particular viewport segment to complete as $t_d$. Parameter that satisfy the following equation are selected in order to avoid buffer underflow. With more bandwidth (BW) available, the client is able to request more potential viewports (N), or increase the partial download percentage a to postpone viewport orientation decision.

$$BW \geq ((N*S*\alpha)+S*(1-\alpha))/T_s \qquad \text{Eq. 6}$$

The time to identify the final head orientation is at $t_d$, which can be derived from Equation 7. At $t_d$, the rest data of identified viewport segment can be downloaded continuously and the partial segment of the rest viewports shall be abandoned. The higher value of a allows the decision to be made much closer to the presentation time, which means the head orientation detection can be more accurate. On the other side, more bandwidth may spend on the viewport segments not matched.

$$t_d = ((N*S*\alpha)/(BW*T_s))+t_p(j-1) \qquad \text{Eq. 7}$$

Based on the user motion analysis and available bandwidth, the client may determine appropriate value of N and α to substantially minimize the switch latency so as to enhance the user experience.

In case each viewport has different quality level representations, the client may request high quality representations for those viewports most likely to be watched at $t_p(j)$, and low quality representations for those viewports less likely to be watched at $t_p(j)$. Equations (6) and (7) can be expressed as follows, where N is the total number of viewport segments to be partially downloaded initially:

$$BW(j) \geq \left(\left(\sum_{i=0}^{N} S(i, j)*\alpha\right) + S(q, j)*(1-\alpha)\right)/T_S \qquad \text{Eq. 8}$$

$$t_d = \left(\left(\sum_{i=0}^{N} S(i,j) * \alpha\right) \bigg/ (BW * T_S)\right) + t_p(j-1) \qquad \text{Eq. 9}$$

Figure 21:
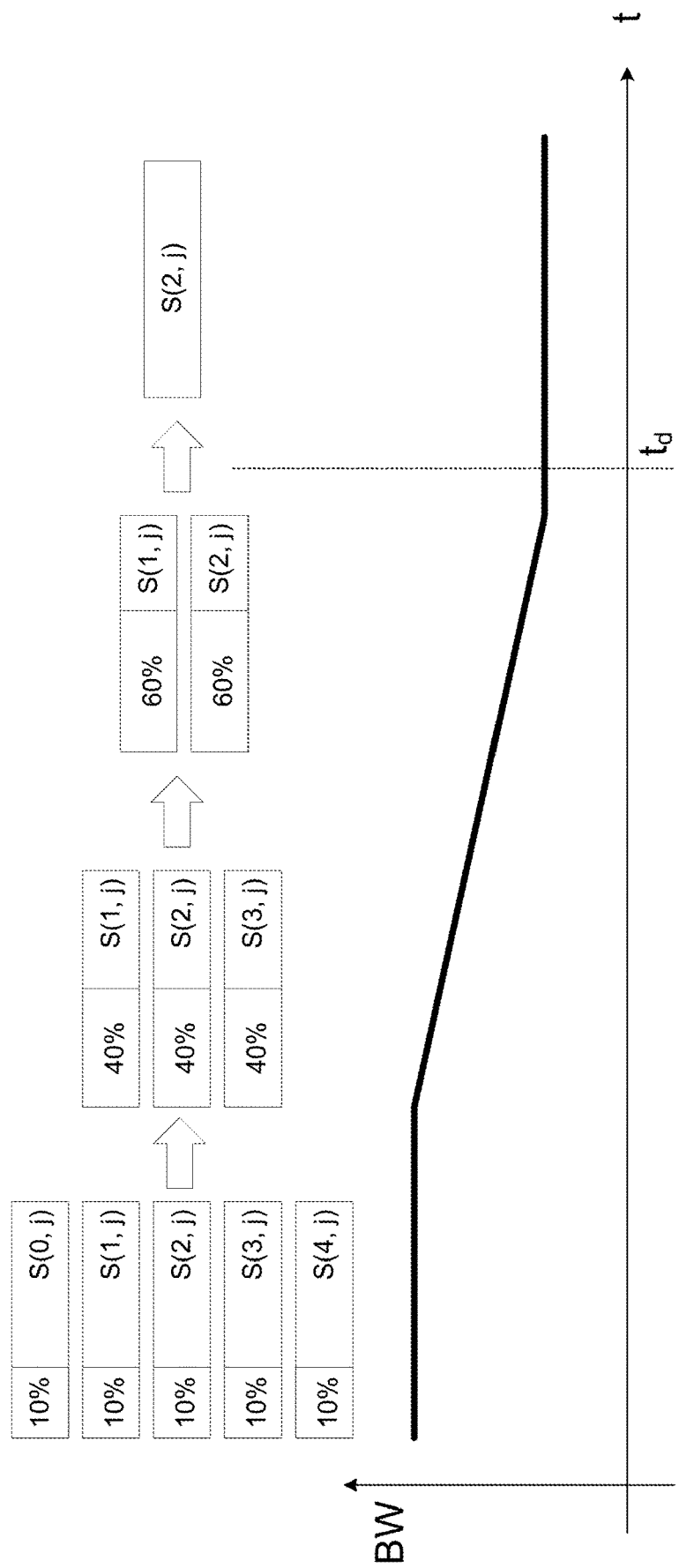
FIG. 21 illustrates an example of one embodiment of viewport representations adjustment.

The balance among BW, N and α may be adjusted dynamically to avoid buffer underflow. For instance, when BW drops, the client may reduce N if the head orientation is consistent, or reduce α to determine the target viewport as soon as possible. As illustrated in the example graph of FIG. 21, the number of partially downloaded segments is reduced when the bandwidth drops.

Figure 22:
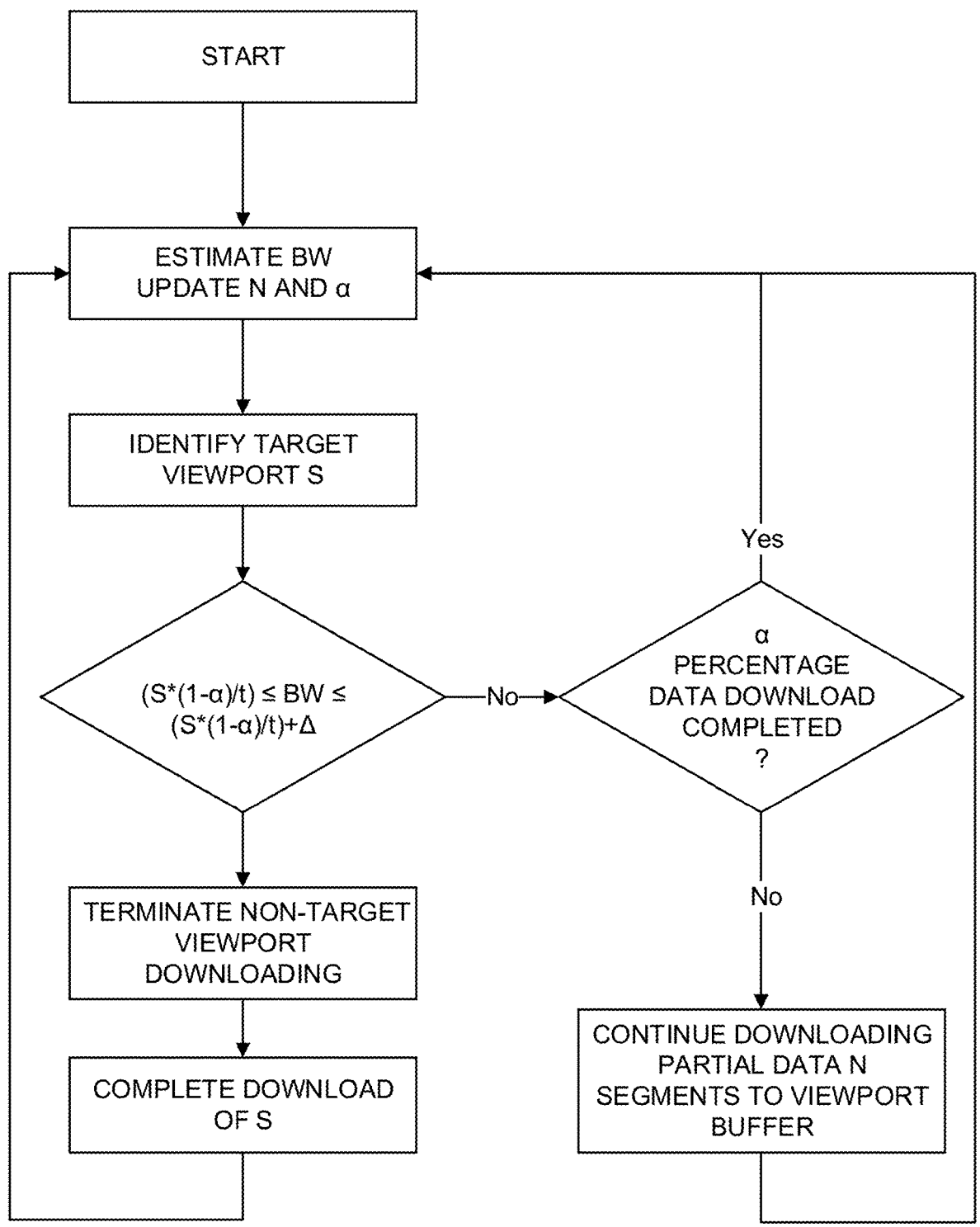
FIG. 22 illustrates a flowchart for one embodiment of a method of partial download scheduling.

FIG. 22 is a flowchart of a partial download scheduling method according to an embodiment. S is the size of target viewport segment and t is the time distance between current time and the next presentation time. Δ is the bandwidth margin preserved to avoid potential mismatch between the estimated bandwidth (BW) and the real network bandwidth available. For the base buffer, the entire segment is downloaded in case base buffer is underflow. Otherwise, part of the segment may be downloaded for the base buffer in order to increase the frequency of updating N and α.

Such partial download scheduling method may apply to the viewport buffer for tile-based and layer-based viewport adaptive streaming. The client may start downloading partial data of a number of identified high quality viewport segments to viewport buffer, and the client may determine the final matched target viewport(s) at $t_d$ to complete the downloading. The number of target viewports may be less than or equal to the number of viewports partially downloaded.

In case layer based scalable 360° video representations are available, the client may also request an enhancement layer segment instead of an independent viewport segment partially using the partial downloaded scheduling method. The enhancement layer may cover part or all of the viewport of the 360° video. The scheduling scheme may reduce the total number of segment candidates, N, if one particular enhancement layer segment covers more viewports. Additional signaling, such as viewportId, may be used to identify the viewports included in the enhancement layer. In case the enhancement layer covers all viewports with identical quality, the determine time $t_d$ may solely depend on the bandwidth because it is not viewport adaptive streaming any more.

Exemplary Embodiments Employing SAND Messaging.

In some embodiments, in order to improve efficiency of viewport buffer downloading, a DASH SAND message may be used to support real-time operations for both dual-buffer scheduling and partial download scheduling methods. For example, the client may use status message such as AnticipatedRequests (Table 1) to announce to the server which specific set of viewport segments the client is interested in by setting the value of @sourceUrl to the URL of these potential viewport segments. The client may use AbsoluteDeadline (Table 2) to indicate the absolute deadline in wall-clock time by when the requested segment needs to be completely received. As a result, the server may cache the corresponding segments to the closest network element to the client such as CDN or edge node in advance. The server may also use PER message, ResourceStatus (Table 3) or DaneResourceStatus (Table 4), to inform the client of the caching status of the corresponding viewport segment so that the client can select the corresponding viewport segment to request.

TABLE 1

AnticipatedRequests parameters

| Parameter | Type | Cardinality | Description |
| --- | --- | --- | --- |
| AnticipatedRequests | object | 1 | |
| request | array | 1 ... N | List of anticipated requests |
| sourceUrl | url | 1 | URL for a segment of a given representation. |
| range | string | 0 ... 1 | This is the byte range specification when the segment is only a part of the content referred to by sourceUrl. |
| targetTime | date-time | 0 ... 1 | Time at which the DASH client expects to request the resource identified by sourceUrl. |

TABLE 2

AbsoluteDeadline parameters

| Parameter | Type | Cardinality | Description |
| --- | --- | --- | --- |
| AbsoluteDeadline | object | 1 | |
| deadline | date-time | 1 | Absolute deadline for the segment to be available in the receiver. |

TABLE 3

ResourceStatus (with baseUrl) parameters

| Parameter | Type | Cardinality | Description |
| --- | --- | --- | --- |
| ResourceStatus | object | 1 | Resource Status Information for resources identified from a base URL. |
| resourceInfo | array | 1 ... N | List of Resource Status Information. |
| baseUrl | url | 1 | Provides the base URL for the associated resources, i.e. the status holds for all resources referenced by this base URL. |
| status | enum | 1 | Provides the status of all associated resource to the base URL. |

TABLE 3-continued

ResourceStatus (with baseUrl) parameters

| Parameter | Type | Cardinality | Description |
| --- | --- | --- | --- |
| reason | string | 0 . . . 1 | Provides some textual information of the reason, e.g., 'you are in broadcast mode'. |

TABLE 4

DaneResourceStatus parameters

| Parameter | Type | Cardinality | Description |
| --- | --- | --- | --- |
| DaneResourceStatus | | 1 | Provides the status of the resources listed below. |
| status | enum | 1 | Specifies the resources that can be assigned to this type. The define types are documented in ISO/IEC FDIS 23009-5: 2015(E), "Dynamic adaptive streaming over HTTP (DASH), part 5: Server and network assisted DASH (SAND)", 2015. |
| resource | anyURl | 0 . . . N | Provides a resource for which the status applies |
| bytes | string | 0 . . . 1 | If present, qualifies that the status only applies to the byte range provided in this attribute. The string shall conform to the byte-range-set according to RFC7233, clause 2.1. If not present, the status applies to the full resource. |
| resourceGroup | string | 0 . . . N | Provides a group of resources for which the status applies. In order to express different types of use cases and to compress the message size, some simplified regular expression patterns are permitted. The regular expression pattern follows the POSIX standard and only a subset of the meta character shall be used such that the regular expression can only be used to define a finite number of segments. DANEs shall make sure that all segments identified by the resourceGroup regular expression have indeed the status conveyed in the message. |

The PER message, Throughput, with the parameter guaranteedThroughput in bits/s (as shown in Table 5) can also be used to improve the performance of the proposed scheduling methods. The client can have advance information regarding the download time of particular viewport segment and the request time $t_r$ for dual-buffer scheduling method, or $t_d$ for partial download scheduling method can be determined.

In exemplary embodiments, besides those existing messages, two operational characteristics of viewport adaptive streaming, ViewportRequests and ViewportSwitchLatency, are added in the SAND messages.

The ViewportRequests message may include the number of requests for each viewport representation or the most viewed viewport representation of particular time interval.

TABLE 5

Throughput (with baseUrl) parameters

| Parameter | Type | Cardinality | Description |
| --- | --- | --- | --- |
| Throughput | object | 1 | |
| baseUrl | string | 1 | Provides the base URL for the associated resources, i.e., the throughput holds for all resources referenced by this base URL. |
| guaranteedThroughput | unsigned int | 1 | Specifies a guaranteed throughput in bits/s. Provides the guarantee for the throughput in a sense that the download time of a resource of size S bytes and from receiving the first byte to receiving the last byte is at most S*8 divided by the value of the attribute. This guarantee is provided with the below value of the percentage of certainty and holds for a request from the DASH client w/o any other concurrent HTTP requests. |
| Percentage | unsigned int | 0 . . . 1 | Specifies the certainty of the above guarantee. The certainty of the guarantee is expressed as a percentage from 0 to 100. If not present, the default value is 100. Values higher than 100 are considered as 100. |

The DASH server may collect such information on the server side for particular client, but may not cover the entire streaming session if the client requests the segments of the same viewport from different servers. The ViewportRequests message may be used as a metrics message to provide a summary of particular 360° video streaming session, such as the most requested viewport representations for each time interval. The DANE may use such statistics to allocate more resource for the most requested viewport representations to improve the user experience and remove the least-requested viewports to save the storage space. Table 6 shows exemplary ViewportRequests parameters, with each viewport representation being identified by the viewportId.

TABLE 6

ViewportRequests parameters

| Parameter | Type | Cardinality | Description |
| --- | --- | --- | --- |
| ViewportRequests | object | 1 | |
| request | array | 1 . . . N | List of viewport requests |
| SourceId | String | 0 . . . N | ID of the source content |
| viewportId | String | 0 . . . N | ID of most requested viewport |
| requestTime | date-time | 0 . . . 1 | Time at which the request collection occurs |

In some embodiments, a ViewportSwitchLatency message is used as status message providing real-time latency feedback from the client to DANE to support real-time operations. The DANE may allocate more bandwidth to particular client link in case the switch latency is out of a desired range. Table 7 shows an exemplary parameter format of ViewportSwitchLatency. In some embodiments, the latency parameter specified in Table 7 is the maximum viewport orientation switch latency. In other embodiments, the latency parameter may be a mean or median value of the switch latency during a given time period or another latency metric.

TABLE 7

ViewportSwitchLatency parameters

| Parameter | Type | Cardinality | Description |
| --- | --- | --- | --- |
| ViewportSwitchLatency | object | 1 | |
| Latency | int | 1 | Maximum viewport orientation switch latency |

Figure 23:
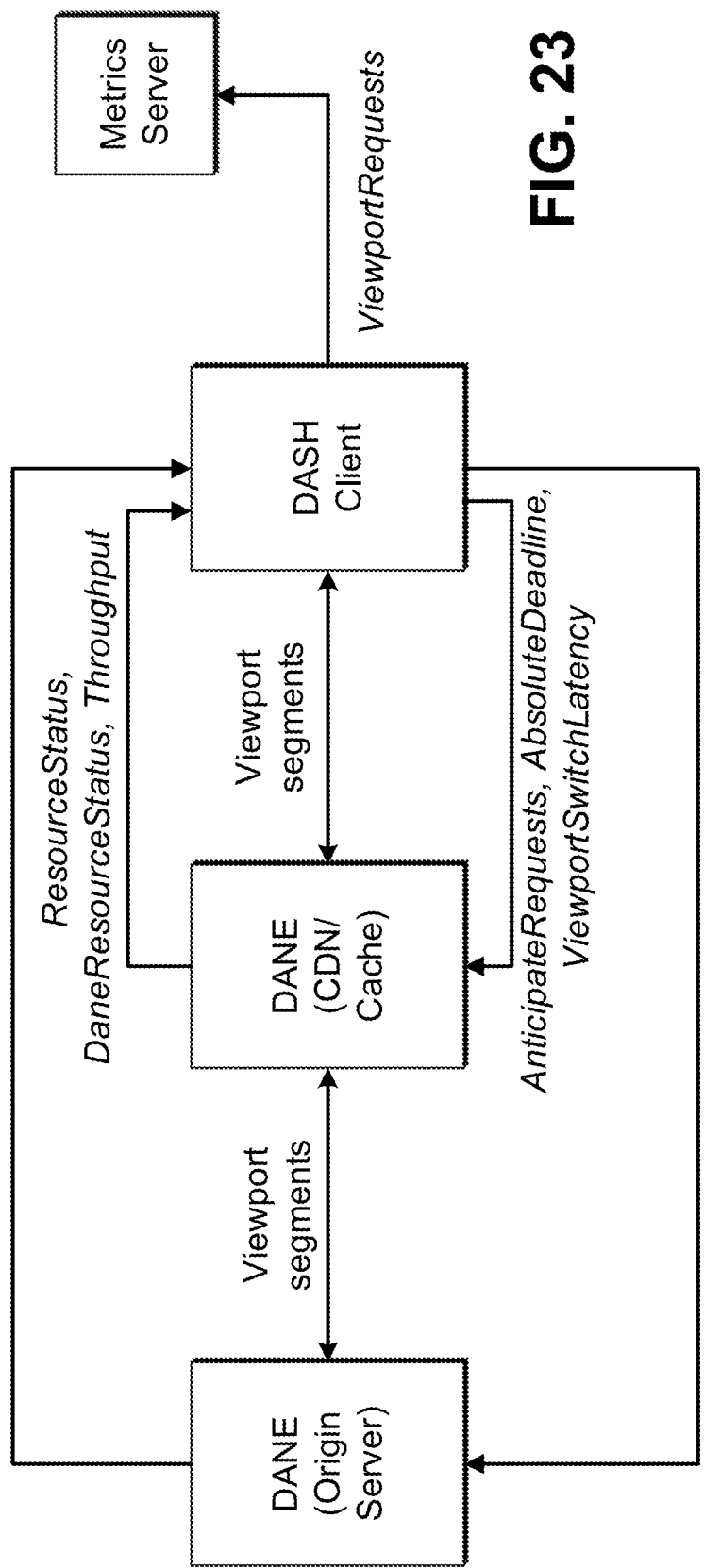
FIG. 23 illustrates one embodiment of communication flow for SAND messages for viewport adaptive streaming.

FIG. 23 shows the SAND messages used in viewport adaptive streaming in an exemplary embodiment to improve the user experience and real-time operation.

Figure 24:
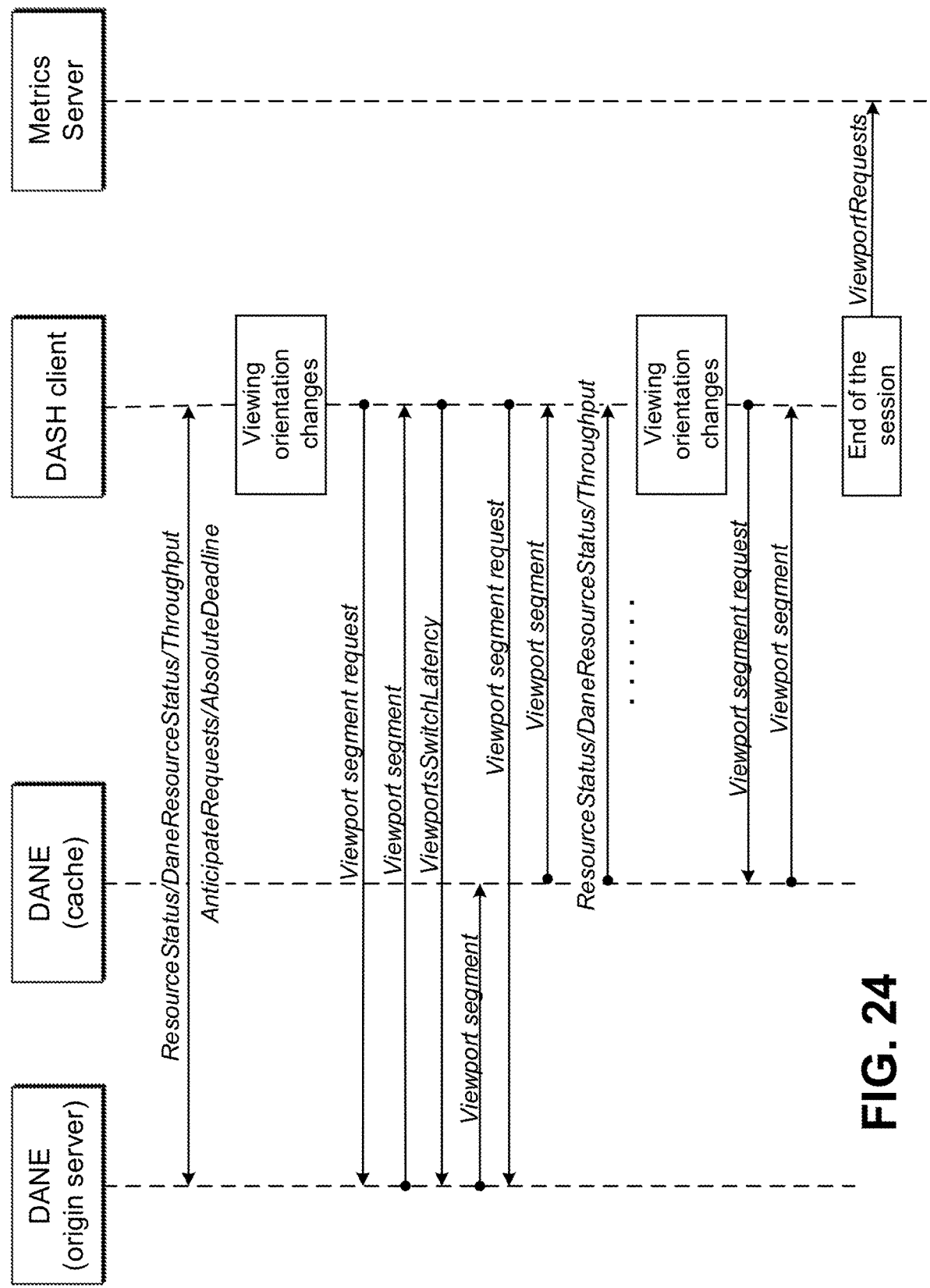
FIG. 24 illustrates a message flow diagram for one embodiment of a DASH SAND message for viewport adaptive streaming.
Figure 25:
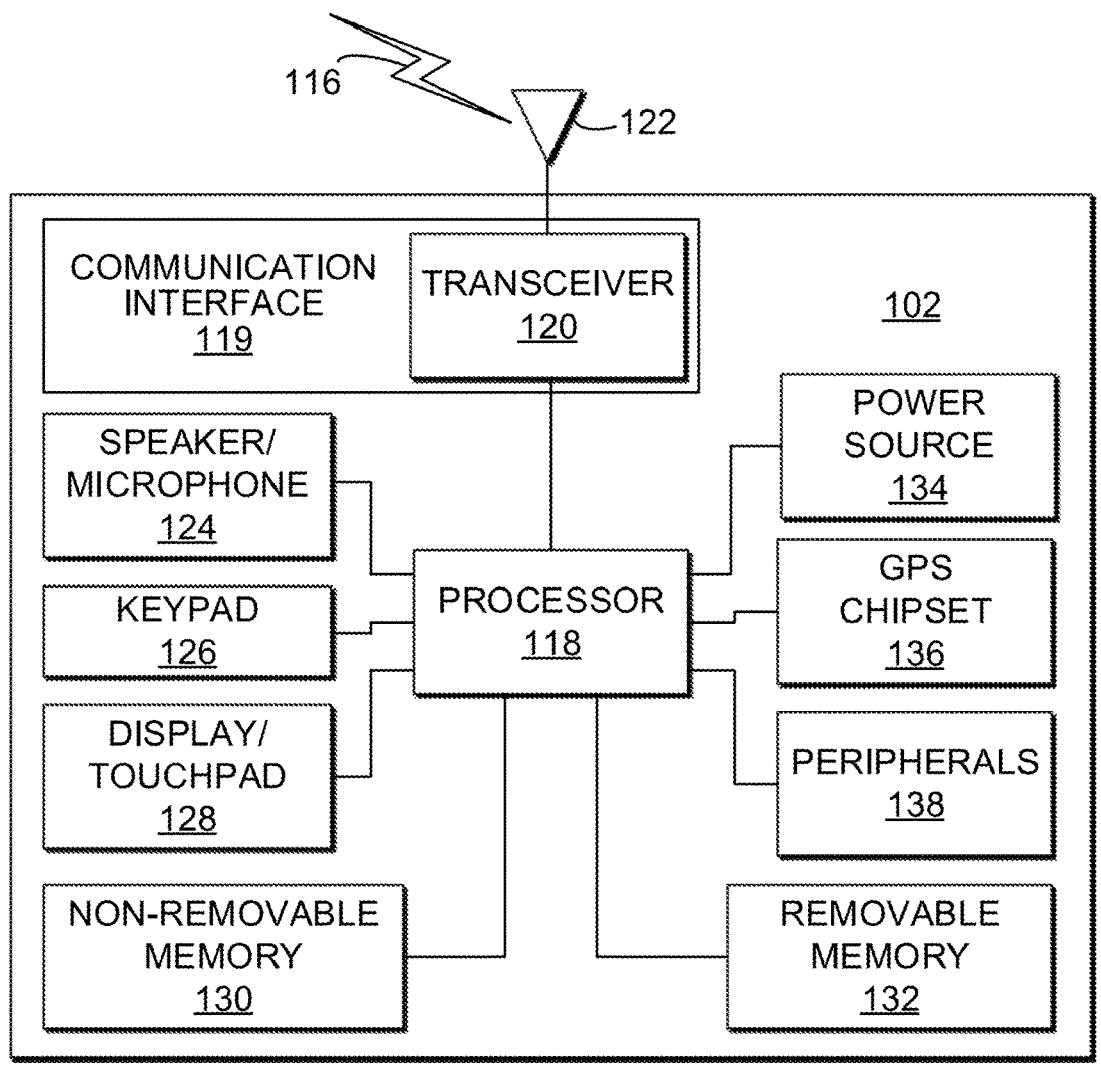
FIG. 25 illustrates an exemplary wireless transmit/receive unit (WTRU) that may be employed as a client device or HMD in some embodiments.
Figure 26:
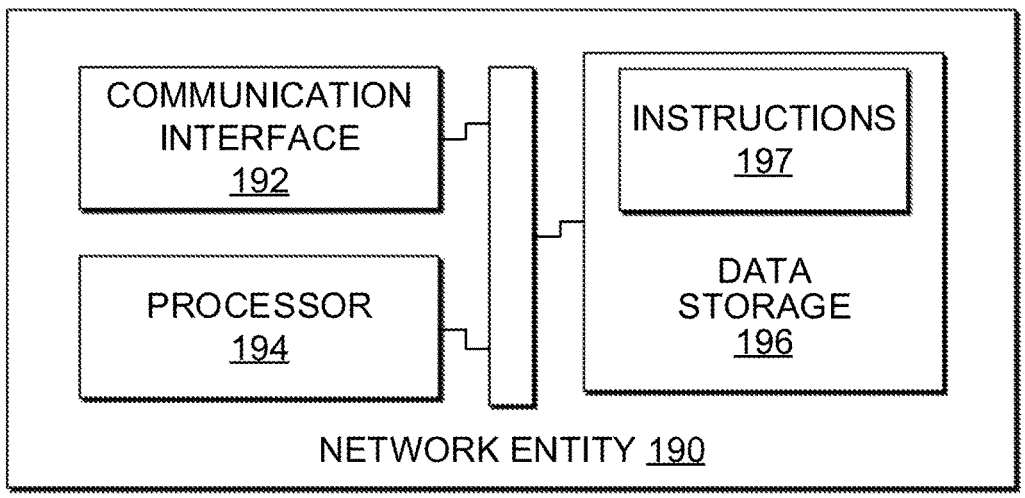
FIG. 26 illustrates an exemplary network entity that may be employed in some embodiments.

FIG. 24 illustrates an example in which SAND messages are exchanged among DANE, DASH client and metrics server in order to improve the real-time operations and metrics collection. The DASH client may send status message such as AnticipateRequests and AbsoluteDeadline to the origin server to indicate which viewport it may request based on the current head orientation prediction and the absolute deadline time by when the requested segment needs to be completely received. The origin server may also send Parameters Enhancing Reception (PER) messages such as ResourceStatus, DaneResourceStatus and Throughput to the DASH client to inform the availability of the segments at current time and throughput characteristics from the origin server to the DASH client. The same status messages may also be exchanged between DANE CDN/cache and DASH client when the corresponding data is hosted by the CDN/cache server.

The DASH client requests a new viewport segment based on the head orientation from the origin server and the origin server delivers the segment to the client. The client may calculate the switch latency and send ViewportSwitchLatency back to the origin server to inform the instant 360° video streaming status to the server. In case the performance is below the expectation, the server may re-allocate the resource for the session. For example, the origin server may distribute the segments to a cache closer to the client to reduce the latency. The DANE cache may also inform the client the availability of the corresponding segments on the cache so that the client may request the following segments from the cache directly. The client may continue sending the ViewportSwitchLatency status to the DANE origin server or DANE cache to improve the real-time operation performance. By the end of the viewing session, the client may collect the viewport statistics and send the metrics message, ViewportRequests, to the metrics server to indicate which viewport is viewed most. The most-viewed viewport statistic may be used to improve the caching strategy and marketing analysis.

Note that various hardware elements of one or more of the described embodiments are referred to as "modules" that carry out (i.e., perform, execute, and the like) various functions that are described herein in connection with the respective modules. As used herein, a module includes hardware (e.g., one or more processors, one or more microprocessors, one or more microcontrollers, one or more microchips, one or more application-specific integrated circuits (ASICs), one or more field programmable gate arrays (FPGAs), one or more memory devices) deemed suitable by those of skill in the relevant art for a given implementation. Each described module may also include instructions executable for carrying out the one or more functions described as being carried out by the respective module, and it is noted that those instructions could take the form of or include hardware (i.e., hardwired) instructions, firmware instructions, software instructions, and/or the like, and may be stored in any suitable non-transitory computer-readable medium or media, such as commonly referred to as RAM, ROM, etc.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:
1. A method of operating a 360-degree video client device, the method comprising:
tracking a series of viewing directions of a user, each viewing direction corresponding to one of a plurality of respective viewport representations of a viewport-adaptive 360-degree video;

adaptively requesting the viewport representations corresponding to the tracked viewing directions;

receiving and displaying the requested viewport representations to the user; and sending, to a metrics server, a viewport request report, wherein the viewport request report identifies a most-viewed viewport for at least one time interval.

2. The method of claim 1, wherein the viewport representations are requested from at least one DASH-Aware Network Element different from the metrics server.

3. The method of claim 1, wherein the viewport request report indicates, for each of a plurality of the viewport representations, a number of requests made for the respective representation.

4. The method of claim 1, wherein the viewport request report further identifies the time interval.

5. The method of claim 1, wherein the viewport request report is sent in a Server and Network Assisted DASH (SAND) message.

6. The method of claim 1, further comprising:

measuring at least one viewport switch latency; and sending to a server a latency report based at least in part on the measured viewport switch latency.

7. The method of claim 1, wherein the 360-degree video client device is a head-mounted display.

8. A 360-degree video client device comprising a display, a processor, and non-transitory computer storage medium storing instructions operative, when executed on the processor, to perform functions comprising:

tracking a series of viewing directions of a user, each viewing direction corresponding to one of a plurality of respective viewport representations of a viewport-adaptive 360-degree video;

adaptively requesting the viewport representations corresponding to the tracked viewing directions;

receiving and displaying the requested viewport representations to the user on the display; and sending, to a metrics server, a viewport request report, wherein the viewport request report identifies a most-viewed viewport for at least one time interval.

9. The client device of claim 8, wherein the instructions are further operative to perform functions comprising:

measuring at least one viewport switch latency; and sending to a server a latency report based at least in part on the measured viewport switch latency.

10. The client device of claim 8, wherein the display is a head-mounted display.

11. The method of claim 1, wherein the viewport representations are requested from at least one network element different from the metrics server.

12. The client device of claim 8, wherein the viewport representations are requested from at least one network element different from the metrics server.

* * * * *